US010997233B2

(12) United States Patent
He et al.

(10) Patent No.: US 10,997,233 B2
(45) Date of Patent: May 4, 2021

(54) MULTI-STAGE IMAGE QUERYING

(71) Applicant: Microsoft Technology Licensing, LLC, Redmond, WA (US)

(72) Inventors: Xiaodong He, Sammamish, WA (US); Li Deng, Redmond, WA (US); Jianfeng Gao, Woodinville, WA (US); Alex Smola, Pittsburgh, PA (US); Zichao Yang, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 918 days.

(21) Appl. No.: 15/097,086

(22) Filed: Apr. 12, 2016

(65) Prior Publication Data

US 2017/0293638 A1    Oct. 12, 2017

(51) Int. Cl.
| | |
|---|---|
| *G06F 16/583* | (2019.01) |
| *G06F 16/683* | (2019.01) |
| *G06F 16/33* | (2019.01) |
| *G06F 16/335* | (2019.01) |
| *G06N 3/08* | (2006.01) |
| *G06N 3/04* | (2006.01) |

(52) U.S. Cl.
CPC ........ *G06F 16/5846* (2019.01); *G06F 16/334* (2019.01); *G06F 16/335* (2019.01); *G06F 16/583* (2019.01); *G06F 16/683* (2019.01); *G06N 3/0445* (2013.01); *G06N 3/0454* (2013.01); *G06N 3/084* (2013.01)

(58) Field of Classification Search
None
See application file for complete search history.

(56) References Cited

U.S. PATENT DOCUMENTS

| | | |
|---|---|---|
| 2008/0159622 A1 | 7/2008 | Agnihotri et al. |
| 2010/0177966 A1* | 7/2010 | Ruzon .................. G06K 9/4609 |
| | | 382/201 |

(Continued)

OTHER PUBLICATIONS

Noh et al., "Image Question Answering using Convolutional Neural Network with Dynamic Parameter Prediction", 2015 (Year: 2015).*

(Continued)

*Primary Examiner* — James Trujillo
*Assistant Examiner* — John J Morris
(74) *Attorney, Agent, or Firm* — Schwegman Lundberg & Woessner, P.A.

(57) ABSTRACT

In some examples, a computing device refines feature information of query text. The device repeatedly determines attention information based at least in part on feature information of the image and the feature information of the query text, and modifies the feature information of the query text based at least in part on the attention information. The device selects at least one of a predetermined plurality of outputs based at least in part on the refined feature information of the query text. In some examples, the device operates a convolutional computational model to determine feature information of the image. The device network computational models (NCMs) to determine feature information of the query and to determine attention information based at least in part on the feature information of the image and the feature information of the query. Examples include a microphone to detect audio corresponding to the query text.

18 Claims, 10 Drawing Sheets

(56) References Cited

U.S. PATENT DOCUMENTS

| | | | | |
|---|---|---|---|---|
| 2012/0296897 | A1* | 11/2012 | Xin-Jing | G06F 16/583 707/728 |
| 2013/0054561 | A1* | 2/2013 | Bennett | G06F 16/951 707/709 |
| 2014/0236577 | A1 | 8/2014 | Malon et al. | |
| 2015/0288869 | A1* | 10/2015 | Furuhashi | H04N 5/76 348/207.11 |
| 2016/0350333 | A1* | 12/2016 | Sacheti | G06F 16/5838 |
| 2016/0378861 | A1* | 12/2016 | Eledath | G06K 9/00718 707/766 |
| 2017/0200066 | A1* | 7/2017 | Wang | G06N 3/08 |

OTHER PUBLICATIONS

Andreas, et al., "Deep Compositional Question Answering with Neural Module Networks," Journal of Computing Research Repository, Nov. 2015, 10 pages.

Antol, et al., "VQA: Visual Question Answering," In Journal of Computing Research Repository, May 2015, pp. 1-20.

"Attention and Memory in Deep Learning and NLP", Published on Jan. 3, 2016, at <<http://www.wildml.com/>>, 9 pages.

Blandanau, et al., "Neural Machine Translation by Jointly Learning to Align and Translate," In Journal of Computing Research Repository, Sep. 2014, pp. 1-15.

Berant, et al., "Semantic Parsing via Paraphrasing", Proceedings of the 52nd Annual Meeting of the Association for Computational Linguistics, vol. 1, Jun. 22, 2014, 11 pages.

Bergstra, et al., "Theano: A CPU and GPU Math Compiler in Python," Proceedings of the 9th Python in Science Conference, Jun. 28-Jul. 3, 2010, 7 pages.

Bordes, et al., "Question Answering with Subgraph Embeddings," Journal of Computing Research Repository, Jun. 2014, 10 pages.

Chen, et al., "ABC-CNN: An Attention Based Convolutional Neural Network for Visual Question Answering," Journal of Computing Research Repository, Nov. 2015, 9 pages.

Chen, et al., "Learning a Recurrent Visual Representation for Image Caption Generation," Journal of Computing Research Repository, Nov. 2014, pp. 1-10.

Chen, et al., "Learning Bidirectional Intent Embeddings by Convolutional Deep Structured Semantic Models for Spoken Language Understanding," Published on Dec. 2015, at <<http://media.wix.com/ugd/b6d786_8dce14216ed3409fb7042abfb64d60c9.pdf>>, 7 pages.

Devlin, et al., "Language Models for Image Captioning: The Quirks and What Works," Proceedings of the 53rd Annual Meeting of the Association for Computational Linguistics, Jul. 26, 2015, pp. 100-105.

Fang, et al., "From Captions to Visual Concepts and Back," Journal of Computing Research Repository, Nov. 2014, 10 pages.

Gao, et al., "Are you Talking to a Machine? Dataset and Methods for Multilingual Image Question Answering," Journal of Computing Research Repository, May 2015, pp. 1-10.

Graves, A., "Generating Sequences with Recurrent Neural Networks," Journal of Computing Research Repository, Aug. 2013, pp. 1-43.

Hochreiter, et al., "Long Short-Term Memory," Journal of Neural Computation, vol. 9, Issue 8, Nov. 15, 1997, pp. 1-32.

Karpathy, et al., "Deep Visual-Semantic Alignments for Generating Image Descriptions," Journal of Computing Research Repository, Dec. 2014, 17 pages.

Kiela, et al., "Learning Image Embeddings Using Convolutional Neural Networks for Improved Multi-Modal Semantics," Proceedings of the Conference on Empirical Methods in Natural Language Processing, Oct. 25, 2014, pp. 36-45.

Kim, Y., "Convolutional Neural Networks for Sentence Classification," Proceedings of the Conference on Empirical Methods in Natural Language Processing, Oct. 25, 2014, pp. 1746-1751.

Kiros, et al., "Unifying Visual-Semantic Embeddings with Multimodal Neural Language Models," Journal of Computing Research Repository, Nov. 2014, pp. 1-13.

Krizhevsky, et al., "Imagenet Classification With Deep Convolutional Neural Networks," Proceedings of Advances in Neural Information Processing Systems Processing Systems, Dec. 3, 2012, pp. 1-9.

Kumar, et al., "Ask me Anything: Dynamic Memory Networks for Natural Language Processing," Journal of Computing Research Repository, Jun. 2015, pp. 1-10.

LeCun, et al., "Gradient-Based Learning Applied to Document Recognition," Proceedings of the IEEE, vol. 86, Issue 11, Nov. 1998, pp. 1-46.

Lin, et al., "Microsoft Coco: Common Objects in Context," Proceedings of 13th European Conference on Computer Vision, Sep. 6, 2014, pp. 1-15.

Ma, et al., "Learning to Answer Questions From Image Using Convolutional Neural Network," Proceedings of CORR, Jun. 2015, 8 pages.

Malinowski, et al., "A Multi-World Approach to Question Answering About Real-World Scenes Based on Uncertain Input" Proceedings of Advances in Neural Information Processing Systems 27: Annual Conference on Neural Information Processing Systems, Dec. 8, 2013, pp. 1-9.

Malinowski, et al., "Ask Your Neurons: A Neural-based Approach to Answering Questions About Images," Proceedings of CORR, May 2015, 13 pages.

Mao, et al., "Deep Captioning with Multimodal Recurrent Neural Networks (M-RNN)," Proceedings of CORR, Dec. 2014, pp. 1-17.

Noh, et al., "Image Question Answering Using Convolutional Neural Network with Dynamic Parameter Prediction," Journal of Computing Research Repository, Nov. 2015, 9 pages.

Novet, J., "Microsoft Researchers Improve AI Tech for Answering Questions About Photos," Published on Nov. 24, 2015, at <<http://venturebeat.com/2015/11/24/microsoft-researchers-improve-ai-tech-for-answering-questions-about-photos/>>, 3 pages.

Pennington, et al., GloVe Global Vectors for Word Representation , Proceedings of the Conference on Empirical Methods in Natural Language Processing, Oct. 25, 2014, pp. 1532-1543.

Ren, et al., "Exploring Models and Data for Image Question Answering," Proceedings of 29th Annual Conference on Neural Information Processing Systems, Dec. 7, 2015, pp. 1-12.

Savage, N., "Seeing More Clearly," retrieved on Mar. 1, 2016 at <<http://cacm.acm.org/magazines/2016/1/195740-seeing-more-clearly/fulltext>>, Communications of the ACM, vol. 59, No. 1, Published Jan. 2016, pp. 2-22.

Severyn, et al., "Learning to Rank Short Text Pairs with Convolutional Deep Neural Networks," Proceedings of the 38th International ACM SIGIR Conference on Research and Development in Information Retrieval, Aug. 9, 2015, pp. 373-382.

Shen, et al., "A Latent Semantic Model with Convolutional-Pooling Structure for Information Retrieval," Proceedings of the 23rd ACM International Conference on Conference on Information and Knowledge Management, Nov. 3, 2014, pp. 101-111.

Simonyan, et al., "Deep Inside Convolutional Networks: Visualising Image Classification Models and Saliency Maps," Journal of Computing Research Repository, Dec. 2013, pp. 1-8.

Simonyan, et al., "Very Deep Convolutional Networks for Large-Scale Image Recognition," Proceedings of CORR, Sep. 2014, pp. 1-14.

Singh, A., "Deep Learning for Visual Question Answering", Retrieved on Jan. 6, 2016, at >>http://home.iitk.ac.in/~avisingh/cs671/project/report.pdf>>, 7 pages.

Socher, et al., "Grounded Compositional Semantics for Finding and Describing Images with Sentences," Journal of Transactions of the Association for Computational Linguistics, vol. 2, Apr. 2014, 12 pages.

Srivastava, et al., "Dropout: A Simple Way to Prevent Neural Networks from Overfitting," Journal of Machine Learning Research, vol. 15, Issue 1, Jun. 2014, pp. 1929-1958.

Sutskever, et al., "Sequence to Sequence Learning with Neural Networks," Proceedings of Twenty-Eighth Annual Conference on Neural Information Processing Systems, Dec. 8, 2014, pp. 1-9.

(56) References Cited

OTHER PUBLICATIONS

Szegedy, et al., "Going Deeper with Convolutions," Proceedings of CORR, Sep. 2014, pp. 1-9.
Vinyals, et al., "Show and Tell: A Neural Image Caption Generator," Proceedings of CORR, Nov. 2014, pp. 1-9.
Weston, et al., "Memory Networks," Retrieved on Jan. 11, 2016, at >>http://arxiv.org/pdf/1410.3916v11.pdf>>, 15 pages.
Wu, et al., "Verbs Semantics and Lexical Selection," Proceedings of the 32nd Annual Meeting on Association for Computational Linguistics, Jun. 27, 1994, pp. 133-138.
Xu, et al., "Show, Attend and Tell: Neural Image Caption Generation with Visual Attention," Proceedings of the 32nd International Conference on Machine Learning, Jul. 6, 2015, 22 pages.
Yang, et al., "Learning Multimodal Semantic Models for Image Question Answering," Carnegie Mellon University and Microsoft Research, 6 pages.
Yang, et al., "Stacked Attention Networks for Image Question Answering," Proceedings of CORR, Nov. 2015, 10 pages.
Yih, et al., "Semantic Parsing for Single-Relation Question Answering," Proceedings of Association for Computational Linguistics, Jun. 2014, 6 pages.
Yih et al., "Semantic Parsing via Staged Query Graph Generation: Question Answering with Knowledge Base," Proceedings of the 53rd Annual Meeting of the Association for Computational Linguistics and the 7th International Joint Conference on Natural Language Processing of the Asian Federation of Natural Language Processing, Jul. 26, 2012, 12 pages.
Yu, et al., "Visual Madlibs: Fill in the Blank Image Generation and Question Answering," Journal of Computing Research Repository, Jun. 2015, pp. 1-10.

\* cited by examiner

MULTI-STAGE IMAGE QUERYING

BACKGROUND

Images can express many types of information. For example, images can describe or represent objects or entities in the image, as well as various aspects of a scene in an image such as any actions occurring in the image, the relation of objects within the image to each other, and the like. However, access to images remains an unaddressed challenge for people with disabilities. In particular, images are often inaccessible to people who are blind or low vision due to the inherently visual nature of those images.

SUMMARY

This disclosure describes systems, methods, and computer-readable media for training computational models, such as neural networks (NNs), or collections thereof, and for using the trained computational models in, e.g., analyzing images or answering questions about content depicted in images. In some examples, a computing device operates a convolutional computational model (CCM) to determine feature information of an image. The computing device operates a first network computational model to determine feature information of a query and operates a second network computational model to determine first attention information based at least in part on the feature information of the image and the feature information of the query. The computing device determines revised feature information based at least in part on the first attention information and the feature information of the query and operates a third network computational model to determine second attention information based at least in part on the feature information of the image and the revised feature information. The computing device determines second revised feature information based at least in part on the second attention information and determines a filter output corresponding to the query based at least in part on the second revised feature information.

In other examples, a computing device refines feature information of query text. To refine, the computing device, at least twice, determines attention information based at least in part on feature information of the image and the feature information of the query text, and modifies the feature information of the query text based at least in part on the attention information. The computing device selects at least one of a predetermined plurality of outputs based at least in part on the refined feature information of the query text.

In still other examples, a system includes a microphone configured to provide an audio-input signal and a speaker configured to receive an audio-output signal and produce corresponding output audio; at least one processor. The system determines query text corresponding to the audio-input signal and operates a network computational model to determine feature information of the query text. The system operates a convolutional computational model (CCM) to determine feature information of an image. The system then operates a first computational stage of a plurality of computational stages to determine feature information of the first computational stage based at least in part on the feature information of the query text and the feature information of the image. The system operates at least one subsequent stage of the plurality of computational stages to determine feature information of that stage based at least in part on the feature information of the image and the feature information of a respective preceding stage of the plurality of computational stages. The system determines output text based at least in part on the feature information of a terminal stage of the plurality of computational stages, and determines the audio-output signal corresponding to the output text.

In yet other examples, a computing device operates a convolutional computational model to determine feature information of an image. The device operates a network computational model to determine feature information of query text. The device determines information of a relationship between the feature information of the image and the feature information of the query text, and selects at least one of a predetermined plurality of outputs based at least in part on the information of the relationship.

This Summary is provided to introduce a selection of concepts in a simplified form that are further described below in the Detailed Description. This Summary is not intended to identify key and/or essential features of the claimed subject matter, nor is it intended to be used as an aid in determining the scope of the claimed subject matter. The term "techniques," for instance, can refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar and/or identical items.

DETAILED DESCRIPTION

Overview

Figure 1:
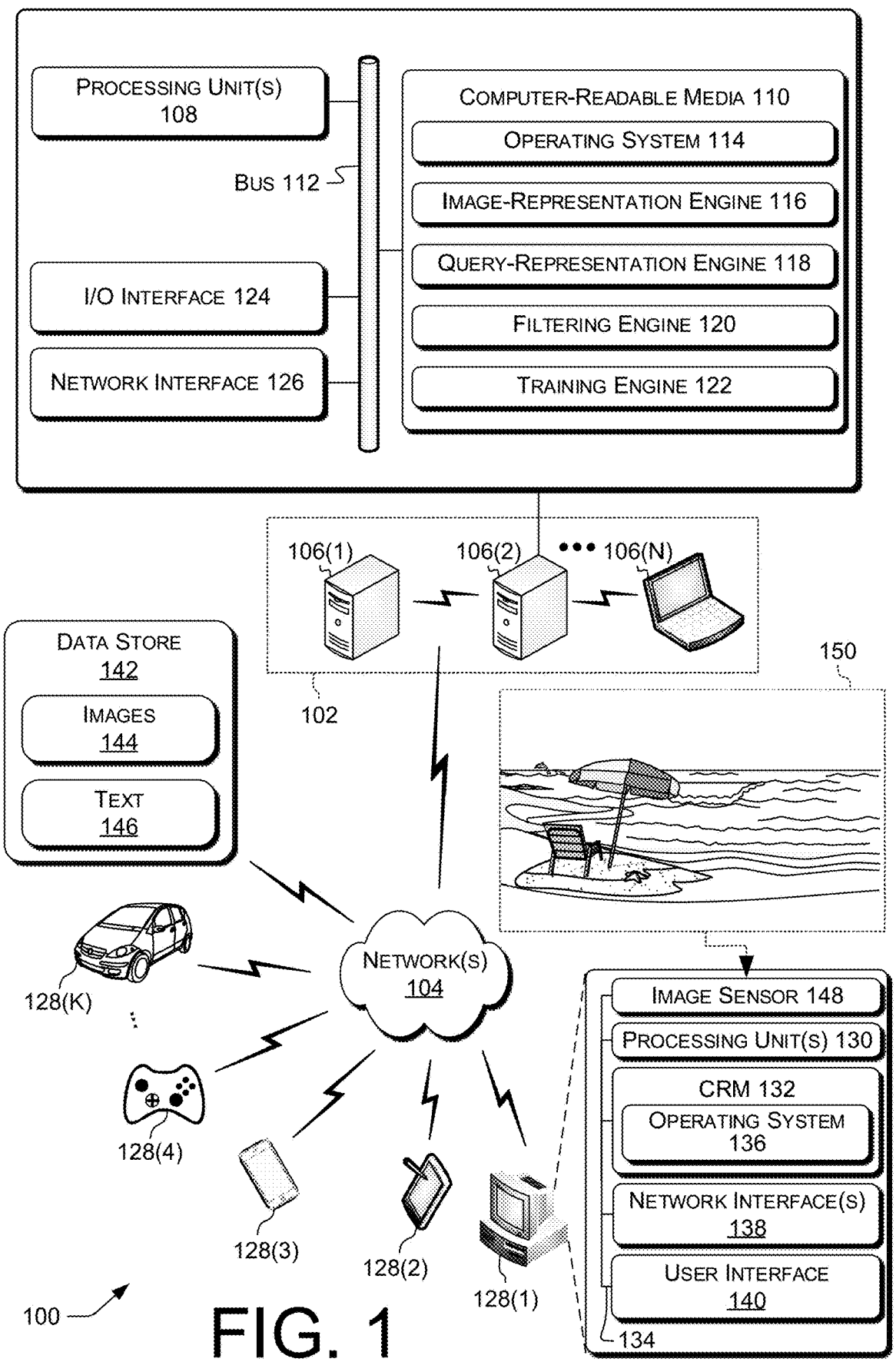
FIG. 1 is a block diagram depicting an example environment in which examples of image analysis can be implemented.

Examples described herein use artificial neural networks (hereinafter "neural networks") to provide non-visual access to image content. Examples described herein provide techniques and constructs to analyze images using computational models, e.g., convolutional neural networks (CNNs), deep neural networks (DNNs) having multiple hidden layers, recurrent neural networks (RNNs), or multiple, intercommunicating single- or multi-layer perceptrons or other networks. Some examples can permit answering questions about images. For example, computational models as described herein can be used to determine natural-language answers to natural-language questions about images. In an example of an image depicting a person holding a red umbrella, a natural-language question can be "what color is the umbrella?" The questions can be expressed, e.g., using textual queries. The natural-language answer can be "red."

In various described examples, the technologies and systems employ a stacked attention model having a plurality of network computational models. In some examples, a convolutional computational model analyzes an image and a network computational model analyzes a query. The results from the two models can be correlated, using the stacked attention model, to determine a probability of a particular answer's being relevant to the image. The answer, or one or more answers, having the highest probability of being relevant to the image and the query is selected as the answer to the query. Providing answers to queries can permit users who are not able to see particular images to receive information about those images, e.g., audibly.

Examples described herein provide techniques and constructs to improve the accuracy with which a computing system can answer a query about an image. Example queries can include textual questions about an object (or entity, and likewise throughout this document) depicted in an image, or about relationships between two or more depicted objects. Examples queries can identify objects of interest by their relationships with other objects, for example, "what is the object to the right of the chair?" Some examples use multiple computational models of the stacked attention model to successively determine which portions of the image are likely relevant to the question. This permits more effectively determining the answers to queries about images, and reduces the likelihood that the system will provide an incorrect answer due to prominent image features that are not relevant to the query. Models trained as described herein can be operated to determine answers to queries about images; describe image contents; or determine or extract portions of images that are relevant to particular queries, e.g., to support image searching. Some examples can be used to search for images of interest, e.g., by analyzing multiple images with a given search query. For example, in order to search for pictures of dogs, the search query "does this picture contain a dog?" can be executed against multiple images. Images for which the filter output corresponding to the query is "yes" (or another Boolean or other value indicating the picture does depict a dog) can be selected as search results.

Some examples train multiple computational models using joint-training processes. This can permit training and operating computational models with more efficient usage of processing units, e.g., since each individual computational model is smaller than would be a combined model. Moreover, using joint training processes can improve the accuracy of the trained models compared to prior schemes.

In various examples, e.g., of computational models trained for image analysis and/or other use cases noted herein, the computational models may include artificial neurons, e.g., interconnected to form a multilayer perceptron and/or other neural network. A neural network can have none, one or more, or at least two hidden layers. The techniques described herein may include the use of an algorithm to parallelize the training of the DNNs across multiple processing units, e.g., cores of a multi-core processor and/or multiple general-purpose graphics processing units (GPGPUs). Accordingly, multiple layers of DNNs may be processed in parallel on the multiple processing units. Neural networks such as DNNs are commonly trained with minibatch-based stochastic gradient descent (SGD). SGD can be parallelized along three dimensions, model parameters, layers, and data (and combinations thereof). Other frameworks besides SGD can be used, e.g., minibatch non-stochastic gradient descent and/or other mathematical-optimization techniques.

Some examples represent queries using recurrent computational models (RCMs). In some examples, an RCM can include artificial neurons interconnected so that the output of a first unit can serve as a later input to the first unit and/or to another unit not in the layer immediately following the layer containing the first unit. Examples include Elman networks in which the outputs of hidden-layer artificial neurons are fed back to those neurons via memory cells, and Jordan networks in which the outputs of output-layer artificial neurons are fed back via the memory cells. In some examples, an RCM can include one or more long short-term memory (LSTM) units, e.g., as discussed below with reference to FIG. 6. In some examples, neuron parameters of artificial neurons in an RCM or other computational model can be determined using a supervised-learning update rule.

In some examples, algorithms for computational-model training as described herein can be performed on a computing device, such as a smart phone, a tablet, a desktop computer, a server, a server blade, a supercomputer, etc. The resulting models can be used on such computing devices and/or on computing devices having one or more input devices, such as a physical keyboard, a soft keyboard, a touch screen, a touch pad, microphone(s), and/or camera(s).

Various environments, configurations of electronic devices, and methods for training and using computational models, e.g., for control applications, are described further with reference to the figures. While many examples described herein relate to servers and other non-consumer electronic devices, other types of electronic devices can be used, e.g., as discussed with reference to FIG. 1. Throughout this document, audio input and output are used for clarity of explanation. However, these forms of communication between a user and a computing system are not limiting. Throughout this document, input can be received in forms other than audio, or output can be provided in forms other than audio. For example, questions and answers can be exchanged over a teletype or other text-based computing device, or any other computing medium or device that, e.g., does not visually present the image about which questions are being asked. In some examples, the image can be visually presented in a user interface configured to receive questions and provide answers. Presenting the image can facilitate, e.g., user review of results of image searches. Moreover, communicating queries and answers via text can permit one computing device to transmit queries to another computing device, and receive answers to those queries.

Illustrative Environment

FIG. 1 shows an example environment 100 in which examples of computational model training systems, e.g., deep neural network (DNN) training systems or multi-model training systems, can operate and/or in which computational-model training and/or use methods such as those described herein can be performed. The environment 100 described constitutes but one example and is not intended to limit the claims to any one particular operating environment. Other environments can be used without departing from the spirit and scope of the claimed subject matter. In some examples, the various devices and/or components of environment 100 include distributed computing resources 102 that can communicate with one another and with external devices via one or more networks 104.

For example, network(s) 104 can include public networks such as the Internet, private networks such as an institutional and/or personal intranet, or some combination of private and public networks. Network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some examples, network(s) 104 can further include devices that enable connection to a wireless network, such as a wireless access point (WAP). Example embodiments support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, distributed computing resources 102 include devices 106(1)-106(N). Device(s) 106 can include one or more computing devices that operate in a cluster or other grouped configuration to share resources, balance load, increase performance, provide fail-over support or redundancy, or for other purposes. For example, distributed computing resources 102 can be provisioned as part of a cluster computing systems ("computing cluster" or "cluster") having several discrete computing nodes that work together to accomplish a computing task assigned to the cluster as a whole. Some such systems can have all or a portion of the cluster deployed in the cloud. Cloud computing allows for computing resources to be provided as services rather than a deliverable product. For example, in a cloud-computing environment, resources such as computing power, software, information, and/or network connectivity are provided (for example, through a rental agreement) over a network, such as the Internet. As used herein, the term "computing" used with reference to computing clusters, nodes, and jobs refers generally to computation, data manipulation, and/or other programmatically-controlled operations. The term "resource" used with reference to clusters, nodes, and jobs refers generally to any commodity and/or service provided by the cluster for use by jobs. Resources can include processor cycles, disk space, random-access memory (RAM) space, network bandwidth (uplink, downlink, or both), prioritized network channels such as those used for communications with quality-of-service (QoS) guarantees, backup tape space and/or mounting/unmounting services, electrical power, etc.

Device(s) 106 can belong to a variety of categories or classes of devices such as traditional server-type devices, desktop computer-type devices, mobile devices, special purpose-type devices, embedded-type devices, and/or wearable-type devices. Thus, although illustrated as desktop and laptop computers, device(s) 106 can include a diverse variety of device types and are not limited to a particular type of device. Device(s) 106 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

Device(s) 106 can include any type of computing device having one or more processing unit(s) 108 operably connected to computer-readable media (CRM) 110 such as via a bus 112, which in some instances can include one or more of a system bus, a data bus, an address bus, a PCI bus, a Mini-PCI bus, and any variety of local, peripheral, and/or independent buses.

CRM described herein, e.g., CRM 110, include computer storage media or communication media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and maintain information for access by a computing device 106 and/or consumer computing device 128 (discussed below).

In contrast to computer storage media, communication media can embody computer-readable instructions, data structures, program modules, or other data in a modulated data signal, such as a carrier wave, or other transmission mechanism. As defined herein, computer storage media does not include communication media.

Executable instructions stored on CRM 110 can include, for example, an operating system 114, an image-representation engine 116, a query-representation engine 118, a filtering engine 120, a training engine 122, or other modules, programs, or applications that are loadable and executable by processing units(s) 108. Additionally or alternatively, the functionally described herein can be performed, at least in part, by one or more hardware logic components such as accelerators. For example, and without limitation, illustrative types of hardware logic components that can be used include Field-Programmable Gate Arrays (FPGAs), Application-specific Integrated Circuits (ASICs), Application-Specific Standard Products (ASSPs), System-on-a-Chip systems (SOCs), Complex Programmable Logic Devices (CPLDs), etc. For example, an accelerator can represent a hybrid device, such as one from XILINX or ALTERA that includes a CPU course embedded in an FPGA fabric.

Device 106 can also include one or more input/output (I/O) interfaces 124 to allow device 106 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). For simplicity, other components are omitted from the illustrated device 106.

Device 106 can also include one or more network interfaces 126 to enable communications between computing device 106 and other networked devices such as consumer computing device(s) 128, also called a user device, through which a consumer or user can submit an input (e.g., a query, question, request for information, etc.). Such network interface(s) 126 can include one or more network interface controllers (NICs) or other types of transceiver devices to send and receive communications over a network. The consumer computing device 128 and/or device 106, in some examples, can be part of a distributed computing architecture.

Other devices involved in determining answers to queries or otherwise analyzing images as described herein can include consumer computing devices 128(1)-128(N). Consumer computing device(s) 128 can belong to a variety of categories or classes of devices such as traditional consumer-type devices, desktop computer-type devices, mobile devices, special purpose-type devices, embedded-type devices, and/or wearable-type devices. Thus, although illustrated as mobile computing devices, which can have less computing resources thA device(s) 106, consumer computing device(s) 128 can include a diverse variety of device types and are not limited to any particular type of device. Consumer computing device(s) 128 can include, but are not limited to, server computers or blade servers such as Web servers, map/reduce servers or other computation engines, or network-attached-storage units, laptop computers, thin clients, terminals, or other mobile computers, personal data assistants (PDAs), wearable computers such as smart watches or biometric or medical sensors, implanted computing devices such as biometric or medical sensors, computer navigation consumer computing devices, satellite-based navigation system devices including global positioning system (GPS) devices and other satellite-based navigation system devices, desktop computers (e.g., 128(1)), tablet computers or tablet hybrid computers (e.g., 128(2)), smartphones, mobile phones, mobile phone-tablet hybrid devices, or other telecommunication devices (e.g., 128(3)), portable or console-based gaming devices or other entertainment devices such as network-enabled televisions, set-top boxes, media players, cameras, or personal video recorders (PVRs) (e.g., 128(4), represented graphically as a gamepad), automotive computers such as vehicle control systems, vehicle security systems, or electronic keys for vehicles (e.g., 128(K), represented graphically as an automobile), or integrated components for inclusion in computing devices, appliances, or other computing devices configured to participate in or carry out image analysis as described herein. In some examples, a consumer computing device 128 can be categorized as a stationary device, a mobile device, or an embedded device. Examples of a stationary device include, but are not limited to, desktop computing devices, server computing devices, a dedicated gaming console, and the like. Examples of mobile devices include, but are not limited to, a laptop computer, a notebook computer, an ultra-portable computer, a netbook computer, or a computing device such as a "smart" mobile telephone, a tablet device, a slate device, a portable video game device, or the like. Examples of embedded devices include, but are not limited to, internet-enabled televisions, automobiles, appliances, and the like. It should be appreciated that technologies described herein are not limited to requiring a consumer computing device 128 to be in communication with a device 106 via the network 104, as aspects described herein can be implemented fully or partially on the consumer computing device 128 without the device 106.

Consumer computing device(s) 128 can represent any type of computing device having one or more processing unit(s) 130 operably connected to computer-readable media (CRM) 132 such as via a bus 134, which in some instances can include one or more of a system bus, a data bus, an address bus, a PCI bus, a Mini-PCI bus, and any variety of local, peripheral, and/or independent buses.

Executable instructions stored on CRM 132 can include an operating system 136 and other modules, programs, or applications that are loadable and executable by processing units(s) 130. Additionally or alternatively, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from XILINX or ALTERA that includes a CPU course embedded in an FPGA fabric.

Consumer computing device 128 can also include one or more I/O interfaces including one or more network interfaces 138 and user interfaces 140 to enable communications between consumer computing device 128 and other networked devices such as other consumer computing device(s) 128 or devices 106 over network(s) 104. Such network interface(s) 138 can include one or more network interface controllers (NICs) or other types of transceiver devices to send and receive communications over a network.

Consumer computing device 128 can also include a user interface 140 to enable the device 128 to receive user input and a response to the input. Examples support the user interface 140 receiving input from the user, such as, for example, a query. Additionally or alternatively, the user interface 140 can provide a display of images, examples of text or other answers to queries, or other outputs not explicitly disclosed herein.

In some examples, consumer computing device 128 and/or devices 106(1)-106(N) of distributed computing resources 102 can also access a data store 142, e.g., a data store accessible through the network 104 or a local data store connected to a bus of, e.g., device 106(1). The data store 142 can be a repository for the persistent storage of various types of files or data. The data store 142 can be a repository for data such as images 144 and/or text 146. The images 144 can be one or more data files representative of something in a visual context. Images 144, and other images described herein, can include, e.g., still images such as digital photographs, frames of video, or composite or artificially-produced images. Throughout this document, images can be represented in raster or vector forms. As used herein, "image" refers to any visual imagery, whether it exists in a form that is comprehensible visually (e.g., a photograph, painting, mural, display, etc.) or not comprehensible visually (data stored in memory corresponding to a humanly-comprehensible visual). The text 146 can be one or more data files representative of a character, phrase, words, sentence, and the like in a textual context. In some examples, the data store 142 can store training data for one or more computational models. The training data can include the images 144 and items the text 146 associated with specific ones of the images 144.

In the illustrated example, at least consumer computing device 128 includes or is communicatively connected with an image sensor 148 configured to provide an image. The image can include a still image or a portion thereof, or a video frame or a portion thereof. In the illustrated example, image sensor 148 is configured to capture an image of a scene 150. Example scene 150 depicts a beach on which are placed a beach chair and, to the right of the beach chair, a beach umbrella. Examples of image sensor 148 can include front- or rear-facing cameras of a smartphone, a light sensor (e.g., a CdS photoresistor or a phototransistor), a still imager (e.g., a charge-coupled device (CCD), a complementary metal-oxide-semiconductor (CMOS) sensor, etc.), a video imager (e.g., CCD or CMOS), a fingerprint reader, a retinal scanner, an iris scanner, a computed-radiography scanner, or the like. Some example image sensors 148 can include visible-light image sensors (e.g., $\lambda \in [400$ nm, 700 nm]) or infrared-light image sensors (e.g., $\lambda \in [700$ nm, 15 µm] or $\lambda \in [700$ nm, 1 mm]).

Illustrative Components

Figure 2:
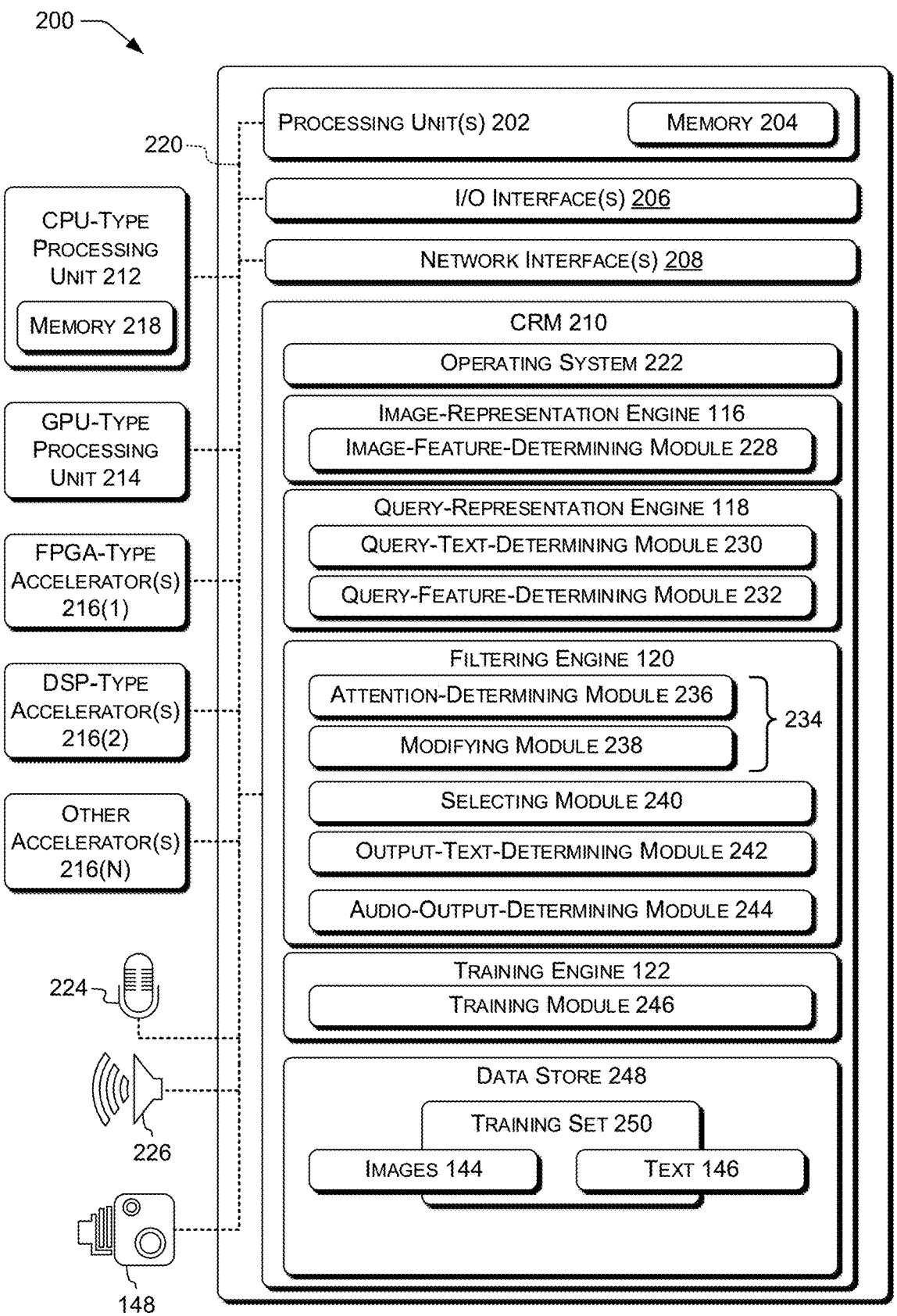
FIG. 2 is a block diagram depicting an example computing device configured to participate in image analysis.

FIG. 2 is a block diagram depicting an example computing device 200 configured to participate in a system for image analysis, e.g., to determine answers to textual queries relating to graphical image content. In some examples, computing device 200 may be one computing device of a distributed computing resource, such as a device 106 from FIG. 1. In device(s) 200, processing unit(s) 202, can include processing unit(s) 108 and can represent, for example, a CPU-type processing unit, a GPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

The processing unit(s) 202 can include or be communicatively connected with at least one memory 204, which can include a memory on board one or more processing unit(s) 202 such as a memory on board a CPU-type processor, a GPU-type processor, an FPGA-type accelerator, a DSP-type accelerator, and/or another accelerator. Some or all of the below-described data and/or processor-executable instructions can be stored on memory 204.

Device(s) 200 can further include at least one input/output (I/O) interface 206, which can include I/O interfaces 124 to allow device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In addition, in device(s) 200, network interface(s) 208, which can include network interface(s) 126, can represent, for example, network interface controllers (NICs) or other types of transceiver devices to send and receive communications over a network.

In some examples, computer-readable media (CRM) 210 of the computing device 200 can represent computer-readable media 110 and/or 132, FIG. 1, and can store a plurality of modules of the image-representation engine 116, the query-representation engine 118, the filtering engine 120, and/or the training engine 122. Computer-readable media 210 can be computer storage media, as discussed above. CRM 210 can store at least instructions executable by processing unit(s) 202 or instructions executable by external processing units such as by an external CPU-type processing unit 212, an external GPU-type processing unit 214, and/or executable by an external accelerator 216, such as an FPGA-type accelerator 216(1), a DSP-type accelerator 216(2), or any other accelerator 216(N). In various examples at least one CPU-type processing unit, GPU-type processing unit, and/or accelerator is incorporated in device 200, while in some examples one or more of a CPU-type processing unit, GPU-type processing unit, and/or accelerator is external to device 200. In some examples, some or all of the below-discussed data or processor-executable instructions can be stored on at least one memory 218, such as memory 218 on board a CPU-type processing unit 212, or other respective memories 218 (omitted for brevity) on board GPU-type processing unit 214, FPGA-type accelerator 216(1), DSP-type accelerator 216(2), or another accelerator 216(N).

Processing unit(s) 202 (or GPU-type processing units 214 or accelerators 216, and likewise throughout this document) can be configured to execute modules of the plurality of modules. For example, computer-executable instructions stored on the computer-readable media 210 can upon execution configure a computer such as a computing device 200 to perform operations described herein with reference to the modules of the plurality of modules. The modules stored in the computer-readable media 210 can include instructions that, when executed by the one or more processing unit(s) 202, cause the one or more processing unit(s) 202 to perform operations described below. Examples of modules in computer-readable media 210 are discussed below.

Bus 220 (shown stippled for clarity) can include bus 112. Bus 220, in some examples, can include one or more of a system bus, a data bus, an address bus, a PCI bus, a Mini-PCI bus, and any variety of local, peripheral, and/or independent buses. Bus 220 can operably connect CRM 210 to processing unit(s) 202 so that processing unit(s) 202 can execute instructions stored on CRM 210. Computer-readable media 210 can include an operating system 222, which can include operating system 114, to load modules into memory 204 for execution by processing unit(s) 202.

In some examples, computing device 200 includes or is communicatively connected with a microphone 224 configured to provide an audio-input signal. The microphone 224 can include or represent an audio sensor configured to receive input audio and provide a corresponding audio-input signal.

In some examples, computing device 200 includes or is communicatively connected with a speaker 226 configured to receive an audio-output signal and produce corresponding output audio (i.e., mechanical vibrations of a medium such as air). The speaker 226 can include or represent an audio actuator such as a headphone, a case-mounted speaker, a hearing aid, or a bone-conduction audio transducer.

In some examples, computing device 200 includes or is communicatively connected with image sensor 148 configured to provide an image, e.g., to provide data of the image, as discussed above. Though microphone 224, speaker 226, and image sensor 148 are illustrated as being connected to bus 220, at least microphone 224, speaker 226, or image sensor 148 can be connected to or can communicate via I/O interface 206.

The image-representation engine 116 can include one or more modules and/or APIs, which are illustrated as image-feature-determining module 228

The query-representation engine 118 can include one or more modules and/or APIs, which are illustrated as query-text-determining module 230 and query-feature-determining module 232.

The filtering engine 120 can include one or more modules and/or APIs, which are illustrated as refining module 234, attention-determining module 236, modifying module 238, selecting module 240, output-text-determining module 242, and audio-output-determining module 244. At least attention-determining module 236 or modifying module 238 can be part of refining module 234, as shown, or can be separate therefrom.

The training engine 122 can include one or more modules and/or APIs, illustrated as training module 246.

In the image-representation engine 116, the query-representation engine 118, the filtering engine 120, and/or the training engine 122, the number of modules can vary higher or lower. Functionality described associated with the above-listed modules can be combined to be performed by a fewer number of modules and/or APIs or it can be split and performed by a larger number of modules and/or APIs. In some examples, at least query-text-determining module 230, output-text-determining module 242, or audio-output-determining module 244 can be modules of an audio-processing engine (omitted for brevity).

In the illustrated example, CRM 210 also includes a data store 248. The data store 248 can be a repository for the persistent storage of various types of files or data. In some examples, data store 248 includes data storage such as a database, data warehouse, or other type of structured or unstructured data storage. In some examples, data store 248 includes a corpus and/or a relational database with one or more tables, indices, stored procedures, and so forth to enable data access such as web tables including one or more of hypertext markup language (HTML) tables, resource description framework (RDF) tables, web ontology language (OWL) tables, and/or extensible markup language (XML) tables, for example. Data store 248 can store data and/or instructions for the operations of processes, applications, components, and/or modules stored in CRM 210 and/or executed by processing unit(s) 202. Data store 248 can act as a repository for other data, explained in more detail below. Data store 248 can include or represent data store 142, FIG. 1.

In some examples, data store 248 can include one or more types of data, examples of which are described below. Data described herein can be combined to be stored in a fewer number of files or partitions or it can be split and stored in a larger number of files or partitions. Processing unit(s) 202, under control of instructions from at least one engine or module described herein, can access data from data store 248.

In the illustrated example, data store 248 can serve as a repository for data such as images 144 or text 146. The images 144 can be one or more data files representative of something in a visual context. The text 146 can be one or more data files representative of a character, phrase, words, sentence, and the like in a textual context. A In some examples, the data store 248 can act as a repository for a training set of data 250. The training set of data 250 is a corpus of data used by training module 246, explained in more detail below. The training set of data 250 can include at least some of the images 144 or text 146. In some examples, the training set of data 250 can be generated by human and/or computer input, whereby the human or computer act as "teachers." For example, to prepare the training set of data 250, one or more images 144 can be presented to a human or computer, which can then provide corresponding text 146. In some examples, the training set of data 250 can include images 144 associated with more than one word of text 146 (e.g. a phrase), e.g., images 144 with associated captions or descriptions. The words of the training set of data 250 can include different word types, including, but not limited to, nouns, verbs, and adjectives.

In some examples, the learning process used to generate the training set of data 250 can be weakly supervised learning, whereby a limited amount of data is used. In some examples, the training set of data 250 includes previously generated captions (or descriptions, and likewise throughout this document) and their associated images. In other examples, the training set of data 250 includes a combination of previously generated captions and their associated images along with other types of training methods. The presently disclosed subject matter is not limited to any particular technology or methodology for generating the training set of data 250.

Figure 3:
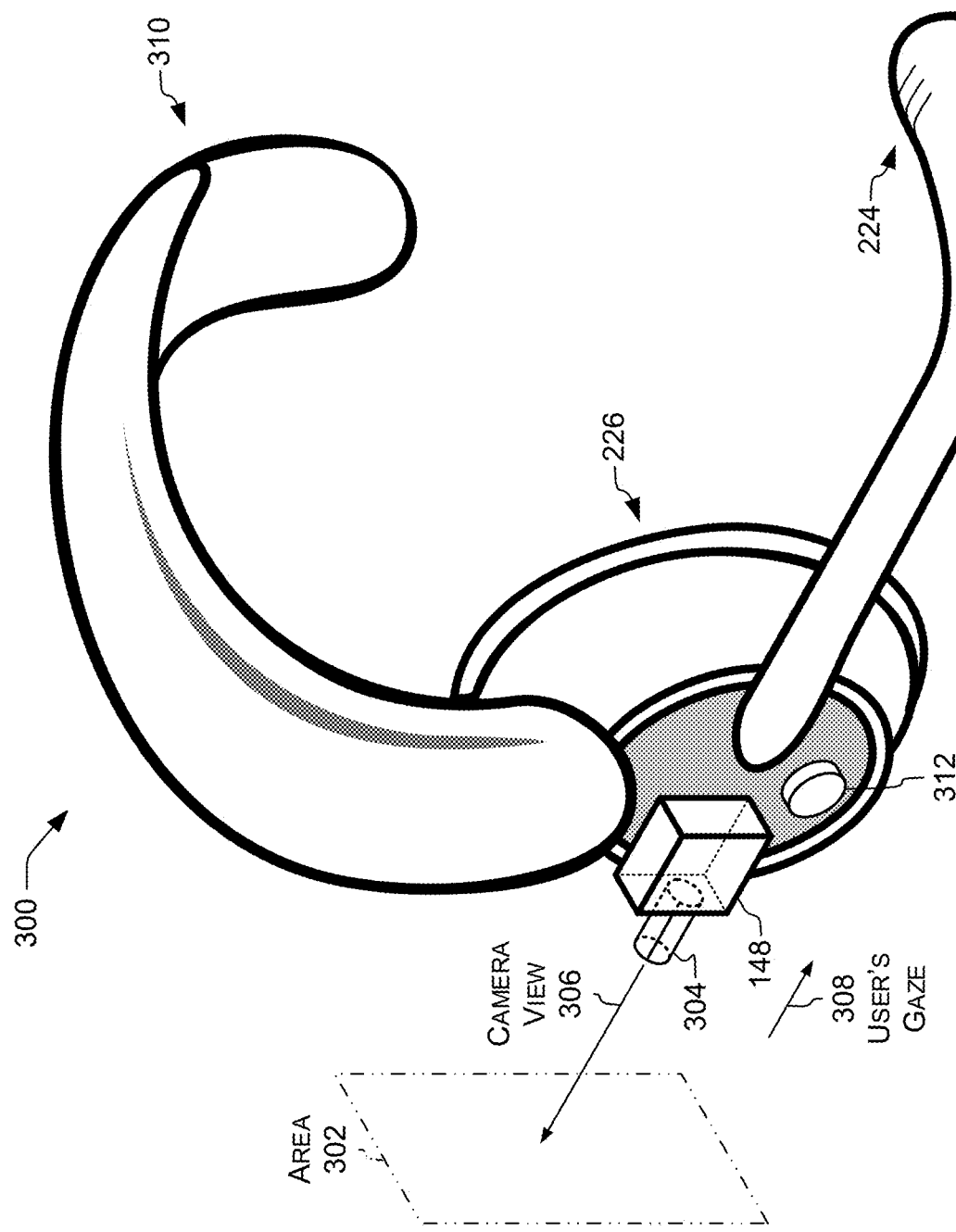
FIG. 3 is a perspective of an example computing device configured to participate in image analysis.

FIG. 3 illustrates a system 300 according to various examples. System 300 can include one or more components of a computing device 200. The depicted system 300 is a headset, although many other form factors can be used. System 300 includes microphone 224 to provide an audio-input signal and speaker 226 to provide output audio. Image sensor 148 is configured to provide an image. In this example, image sensor 148 is configured to provide an image of an area 302, e.g., an area 302 not visible to the user of system 300. Image sensor 148 images through a lens 304 in camera-view direction 306, and system 300 is configured to be worn by a user looking in gaze direction 308. A mount 310, in this example a padded headband, is configured to retain the image sensor 148 in position to provide the image of the area 302 not visible to the user of system 300. The area 302 is not visible to a user if it is not visible to that user at a particular time, regardless of whether the users could voluntarily look in a different direction to see area 302.

User-input control 312, depicted as a pushbutton in this example, can trigger operation of at least one component of system 300. For example, processing unit(s) 202 can respond to actuation of user-input control 312 to provide the feature information of the image, determine output text, and provide the output audio. For example, system 300 can be integrated into a cycling helmet. System 300 can then audibly provide the rider of the cycle with answers to the rider's spoken queries relating to what is behind the rider. Additionally or alternatively, in some examples, image sensor 148 can be configured to image in a different direction, e.g., up, down, forward, or to either side. Additionally or alternatively, in some examples, lens 304 can include, e.g., at least one of a zoom lens or an optical filter.

In some examples, output text can be determined as discussed below with reference to FIG. 4, 7, or 8, or with reference to FIG. 5 or 9. Operations such as those described below with reference to FIGS. 4 and 5 can be carried out by hardware within system 300, by servers such as cloud service computing devices, or a combination thereof.

Figure 4:
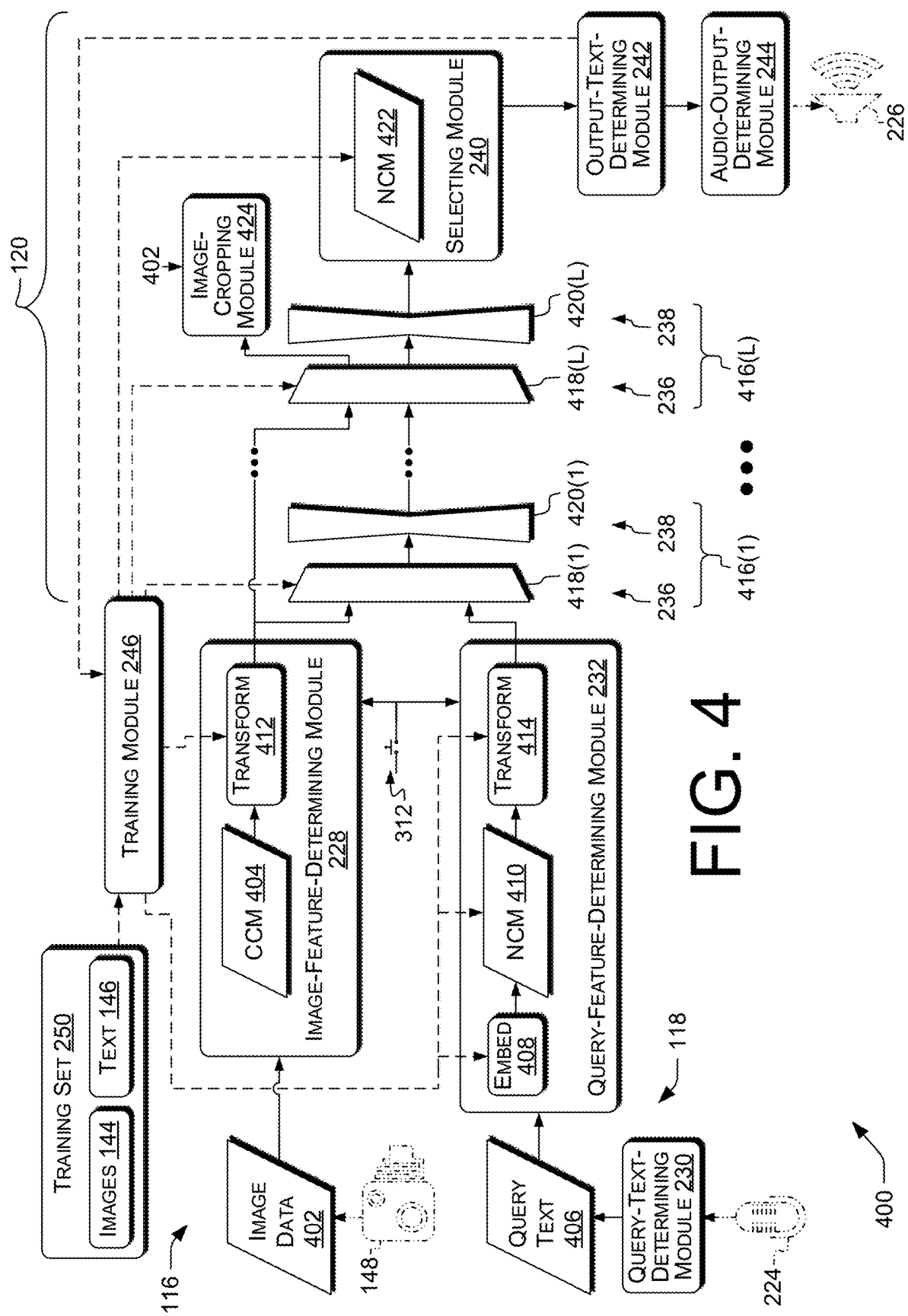
FIG. 4 is a dataflow diagram illustrating an example of image analysis using one or more computational stages.

FIG. 4 is a dataflow diagram 400 illustrating example interactions between the modules illustrated in FIG. 2. Further details of operations herein are described below with reference to at least FIGS. 7 and 8. FIG. 4 shows dataflow related to both training and operation of computational models. Training dataflow paths are shown dashed for clarity.

In some examples of training, training set of data 250, including images 144 and corresponding text 146, is provided to training module 246. Training module 246 can jointly train various computational models, e.g., neural networks, as described in more detail below with reference to FIGS. 8 and 9. Training module 246 can operate modules, e.g., at least image-feature-determining module 228, query-feature-determining module 232, attention-determining module 236, modifying module 238, selecting module 240, or output-text-determining module 242, to determine output text or other model outputs corresponding to individual images 144 or groups of images 144. Training module 246 can then determine or modify parameters of computational models such as those described below.

In some examples, image data 402, e.g., of a still image or a frame of video, is received, e.g., from image sensor 148. In some examples, the image data 402 includes a 448×448 matrix of pixel data, e.g., RGB or grayscale pixel data, and the image is divided into a 14×14 matrix of 32×32 regions. Image-feature-determining module 228, which is an example of a component of image-representation engine 116, operates a convolutional computational model (CCM) 404 based at least in part on image data 402 to determine feature information of the image. For example, image-feature-determining module 228 can operate CCM 404 one or more times for each of one or more of the regions of the image. Additionally or alternative, image-feature-determining module 228 can operate CCM 404 one or more times for the image as a whole. In some examples, CCM 404 can have 100352 outputs, 512 outputs for each of 14×14 regions of the image.

In some examples, the CCM 404 is trained before it is operated. For example, CCM 404 can be trained using minibatch gradient descent with momentum. Training data can include images and associated classification data. CCM 404 can be trained over a number of epochs sufficient to provide a desired classification accuracy, e.g., in the results of the softmax layer. The outputs of the last pooling layer, or in general of a layer earlier than the final layer of the CCM 404, can then be used as the image features, as discussed below. During operation of a trained CCM 404, it is not necessary to operate any of the layers after the layer from which the image features are taken. This can increase operation speed and reduce memory usage and power usage compared to operating a full CCM 404 including terminal fully-connected or softmax layers.

In some examples, the CCM 404 can include a convolutional network according to the VGGNet family of configurations, e.g., using 3×3 convolution filters, 2×2 pixel windows with stride 2 (e.g., non-overlapping) in the max-pooling layers, or between 11 layers and 19 layers. In some examples, the last layers of CCM 404 include a final pooling layer followed by one or more fully-connected or softmax layers. In some examples, the features can be the outputs of the last pooling layer in CCM 404, and the outputs of further layers can be used for training. Using the outputs of the last pooling layer in CCM 404 can permit retaining spatial information about image 144 that might be destroyed by fully-connected layers. In an example, CCM 404 outputs 512 feature values for each of one or more regions of the image, e.g., for each of the 196 (=14×14) regions of image data 402 as described above. In some examples, the output $f_1$ of CCM 404 has dimension 512×14×14.

In some examples, query-representation engine 118 is configured to operate a first network computational model to determine feature information of a query, e.g., of text of the query. In the illustrated example, microphone 224 provides an audio-input signal, e.g., 8 kHz, 8-bit PCM samples, 44.1 kHz, 16-bit PCM samples, analog mic-level or line-level audio, or another signal format. Query-text-determining module 230 determines query text 406 corresponding to the audio-input signal. In some examples, query-text-determining module 230 operates a speech-recognition process to determine the query text 406. Example speech-recognition processes can include applying a hidden Markov model (HMM), neural network, or DNN to successive samples of the audio-input signal, e.g., of 10 ms in length. For example, the Viterbi algorithm can be used to find the states of the HMM, e.g., the phonemes, that most closely correspond to the audio-input signal. Speech-recognition processes can, e.g., determine phonemes based at least in part on the audio-input signal, then determine words of the query text 406 based at least in part on the phonemes. The query text 406 can be represented, e.g., using a string, one-hot, or bag-of-words representation.

Query-feature-determining module 232 operates on query text 406. In some examples, query-feature-determining module 232 can pre-process query text 406 using an embedding operation 408 ("Embed") to determine the representation of query text 406 in a feature space, e.g., of 500 or 640 elements. The size of the feature space can be determined empirically based at least in part, e.g., on the vocabulary size. Too small a feature space can increase confusion between words, and too large a feature space can increase training time.

In some examples, embedding operation 408 can include a matrix multiplication. For example, each word t in query text 406 can be represented as a one-hot vector representation $q_t$ of words in a dictionary. Embedding operation 408 can then be carried out as in Eq. (1), in which $W_e$ is an embedding matrix mapping words to a feature space, e.g., a lower-dimensional feature space.

$$x_t = W_e q_t, t \in \{1, 2, \ldots,\} \qquad (1)$$

Query-feature-determining module 232 can operate a network computational model (NCM) 410 (a first network computational model) to determine feature information of the query text 406 or the embedding thereof. The NCM 410, and other computational models described in this document, can include one or more layers or nodes and any interconnection pattern between layers or nodes. In an example, NCM 410 includes a multilayer perceptron. In some examples, NCM 410 outputs a vector of, e.g., 500 elements. The vector represents the query text 406.

In some examples, NCM 410 can include a neural network or other computational model including at least one long short-term memory (LSTM) unit. LSTM units are discussed below with reference to FIG. 6. The query text 406 can be provided to NCM 410 one word at a time, and the LSTM state can be progressively modified by query-feature-determining module 232, as the words are received, to represent the query text 406. NCM 410 including an LSTM can operate according to Eqs. (2)-(6), in which t is the number of words input to the LSTM up to step t, $x_t$ is a current input, e.g., corresponding to a word of the query text 406 or provided by embedding operation 408, $c_t$ is a value stored in the memory cell of the LSTM, $h_t$ is a state output by the LSTM, $i_t$ is a value provided by an input gate, $f_t$ is a value provided by a forget gate, $o_t$ is a value provided by an output gate, W matrices and b vectors are weight and bias parameters, respectively, and σ is a sigmoid nonlinearity.

$$i_t = \sigma(W_{xi}x_t + W_{hi}h_{t-1} + b_i) \quad (2)$$

$$f_t = \sigma(W_{xf}x_t + w_{hf}h_{t-1} + b_f) \quad (3)$$

$$o_t = \sigma(W_{xo}x_t + W_{ho}h_{t-1} + b_o) \quad (4)$$

$$c_t = f_t c_{t-1} + i_t \tan h(W_{xc}x_t + W_{hc}h_{t-1} + b_c) \quad (5)$$

$$h_t = o_t \tan h(c_t) \quad (6)$$

To operate an LSTM-containing NCM 410, query-feature-determining module 232 can serially provide the words of the query text 406, or their embedded representation per Eq. (1), to NCM 410. NCM 410 can process the inputs, e.g., representations $x_t$, e.g., as in Eqs. (2)-(6), over words 1 . . . T. The feature information of the query can be the output $h_T$ of NCM 410 after the last word or representation has been provided.

In some examples, NCM 410 can include a convolutional neural network (CNN) operating, e.g., at least on unigrams, bigrams, trigrams, or N-grams in the query text 406, followed by a max-pooling layer. In some examples, the unigram, bigram, and trigram convolution filters can have sizes of 128, 256, and 256, respectively. In some examples, NCM 410 can provide a vector, e.g., of 640 (=128+256+256) elements, that represents the query text 406.

In some examples, NCM 410 includes a CNN that operates on the concatenation $x_{1:T}$ of the embedding vectors $x_t$ (for all $x_t$ the same length). Concatenation can be as in Eq. (7).

$$X_{1:T} = [x_1, x_2, \ldots, x_T] \quad (7)$$

One or more convolutions are then performed. The window size for each convolution is denoted c. Convolution outputs $h_{c,q}$, $q \in [1, \ldots, T-c+1]$ for window size c can then be determined as in Eq. (8), in which $W_c$ is a weight matrix and $b_c$ is a bias vector.

$$h_{c,q} = \tan h(W_c X_{q:q+c-1} + b_c). \quad (8)$$

The convolution output vectors $h_{c,q}$ can then be concatenated as in Eq. (9) and pooled as in Eq. (10), e.g., by coordinate-wise max-pooling.

$$h_c = [h_{c,1}, h_{c,2}, \ldots, h_{c,T-c+1}] \quad (9)$$

$$\tilde{h}_q = \max_q [h_{c,1}, h_{c,2}, \ldots, h_{c,T-c+1}] \quad (10)$$

The pooled outputs from multiple window sizes can be concatenated to form the feature information of the query as in Eq. (11).

$$h = [\tilde{h}_1, \tilde{h}_2, \tilde{h}_3] \quad (11)$$

In some examples, the outputs of CCM 404, e.g., of the last pooling layer thereof, do not correspond to or are otherwise not directly comparable with the outputs of NCM 410. For example, CCM 404 can provide a 512-element representation of an image region, and NCM 410 can provide a 500- or 640-element representation of the query text 406. In some examples, the image-feature determining module 228 operates a transform 412 to change the representation provided by CCM 404 to a representation corresponding to the representation provided by NCM 410. In some examples, the query-feature determining module 232 operates a transform 414 to change the representation provided by NCM 410 to a representation corresponding to the representation provided by CCM 404. In some examples, both transforms 412 and 414 are used to change the representations provided by CCM 404 and NCM 410 to compatible representations, e.g., to respective, mutually-comparable representations. Transforms 412 or 414 can compute functions of the form given in Eq. (12).

$$\text{transform output} = \tan h(W_f h_f + b_f) \quad (12)$$

where $h_f$ is the input to the transform 412 or 414, $W_f$ is a weight matrix, and $b_f$ is a bias vector.

In some examples, at least embedding operation 408, transform 412, or transform 414 can include data or computer program instructions to process the respective input using a single-layer or multi-layer perceptron, e.g., having tan h or sigmoid nonlinearity, another type of network computational model, an embedding matrix, or another transformation function. In some examples, at least embedding operation 408, transform 412, or transform 414 is an identity transform, or is omitted, disabled, or otherwise not used. In at least one example, embedding operation 408 can include a matrix multiplication, transform 412 can include a single-layer perceptron with tan h nonlinearity, and transform 414 can be an identity transform or can be omitted.

In some examples, the respective outputs from the image-feature-determining module 228 and the query-feature determining module 232 are provided to a first computational stage 416(1) of a plurality of computational stages 416(1)-416(L) (individually or collectively referred to herein with reference 416), where L is any integer greater than or equal to 1. Stage 416(L) is referred to herein as a "terminal stage," e.g., a stage 416 providing output that is not an input to another stage 416 as described below. Filtering engine 120 can operate the computational stages 416 to determine feature information of individual ones of the computational stages 416. The illustrated computational stages 416(1)-416(L) can represent separate processing blocks, e.g., modules, circuits, or operations. The illustrated computational stages 416(1)-416(L) can additionally or alternatively depict an unrolled view of an iterative process in which the output from a single computational stage 416 is fed back to serve as the input of that particular computational stage 416. References in this document to separate computational stages 416 apply equally to separate iterations of execution of a particular computational stage 416, except as expressly noted.

In some examples, filtering engine 120 can operate the first computational stage 416(1) to determine feature information of (e.g., provided by) the first computational stage 416(1). The filtering engine 120 can operate the first computational stage 416(1) based at least in part on the feature information of the image from the image-feature-determining module 228, e.g., the output of CCM 404 or transform 412. The filtering engine 120 can operate the first computational stage 416(1) based at least in part on the feature information of the input text from the query-feature-determining module 232, e.g., the output of NCM 410 or transform 414. In some examples, at least one of the computational stages 416 can include a network computational model (NCM) 418 and a revising unit 420. In the illustrated example, computational stage 416(1) includes NCM 418(1) and revising unit 420(1), and computational stage 416(L) includes NCM 418(L) and revising unit 420(L). NCM 418(1) can be configured, e.g., as a scoring or attention-determining network. For example, at least one NCM 418 can include a single- or multi-layer perceptron. The output of the perceptron can be the output of NCM 418, or a softmax or other normalization function or layer can determine the output of NCM 418 based on the output of the perceptron.

In some examples, attention-determining module 236 can operate NCM 418(1) to determine first attention information based at least in part on the feature information of the image and the feature information of the query. For example, NCM 418(1) can take as inputs one or more elements of a vector of the feature input of the image and one or more elements of a vector of the feature information of the query. NCM 418(1) can then determine the feature information, e.g., as a vector of output values. In some examples, the feature information can include a vector having the same dimension as the feature information of the query. In some examples, NCM 418(1) can compute the first attention information as in Eqs. (13) and (14), where $u_0 = v_Q$ and trailing ",0" or ",1" subscripts denote the stage 416 in which the equation is applied, starting from stage 0 (or, without loss of generality, stage 1).

$$h_{A,0} = \tan h(W_{I,A,0} v_1 \oplus (W_{Q,A,0} u_0 b_{A,0})) \quad (13)$$

$$p_{1,0} = \text{softmax}(W_{P,0} h_{A,0} + b_{P,0}) \quad (14)$$

In Eqs. (13) and (14), $M \oplus V$ denotes addition of vector V to each column of matrix M. $u_0 \in \mathbb{R}^d$ is the d-element question vector, $W_{Q,A,0} \in \mathbb{R}^{k \times d}$ is a weight matrix for the query features, $b_{A,0} \in \mathbb{R}^k$ is a k-element weight vector, $v_I \in \mathbb{R}^{d \times m}$ is a matrix of d feature values for each of m image regions (e.g., determined by CCM 404), and $W_{I,A,0} \in \mathbb{R}^{k \times d}$ is a weight matrix for the image features. $h_{A,0} \in \mathbb{R}^{k \times m}$ is a matrix of layer outputs. $W_{P,0} \in \mathbb{R}^{1 \times k}$ is a weight vector, and $b_{P,0} \in \mathbb{R}^{1 \times m}$ a bias vector, for the $h_A$ values. Output $p_{I,0} \in \mathbb{R}^{1 \times m}$ (or, transposed, $\mathbb{R}^m$) of NCM 418(1) is a vector of the first attention information. $p_{i,0}$ can represent a relevance of each image region m to the query represented as $u_0$ (i.e., $V_Q$).

In some examples, modifying module 238 can determine revised feature information based at least in part on the first attention information and the feature information of the query. In the illustrated example, modifying module 238 can operate a respective revising unit 420 in at least one computational stage 416. Revising units 420 can include averaging, normalization, summing, or concatenating operators, e.g., operating on vector outputs from corresponding NCMs 418. For example, revising unit 420 can compute a sum of feature information of the image, weighted by the first attention information. Revising unit 420 can additionally compute the revised feature information as a sum of the weighted sum and the feature information of the query. The output of revising unit 420($\ell$), $\ell < L$, can be provided as the input of NCM 418($\ell+1$). The output of revising unit 420(L) can be provided, e.g., to selecting module 240.

In some examples, revising unit 420($\ell$) can determine the revised feature information as in Eqs. (15) and (16).

$$\tilde{v}_{I,0} = \sum_{j=1}^{m} p_{I,0}(j) v_I(j) \quad (15)$$

$$u_1 = \tilde{v}_{I,0} + u_0 \quad (16)$$

$\tilde{v}_{I,0} \in \mathbb{R}^d$ is a sum of the d-element vectors $v_I(j), j \in [1, \ldots, m]$, representing them image regions. The sum is weighted by the relevance $p_{I,0}(j)$ to the query of each image region j. $u_1$ is the revised feature information, which combines information about the query ($u_0$) with information about the image ($\tilde{v}_{I,0}$).

In some examples, filtering engine 120 can operate each of a predetermined number of subsequent stages 416, e.g., one or more subsequent stages 416, of the plurality of computational stages 416. For brevity, only stage 416(L) is depicted. The filtering engine 120 can operate each subsequent stage 416, e.g., stage 416(L) if L=2 or each of stages 416(2)-416(L) if L>2, to determine feature information of that stage based at least in part on the feature information of the image and the feature information of a respective preceding stage of the plurality of computational stages. For example, the feature information of (e.g., provided by) stage 416(1) can be used in determining the feature information of stage 416(2). In an example, filtering engine 120 can operate NCM 418(2) (in the depicted example, NCM 418(L)) to determine second attention information based at least in part on the feature information of the image and the revised feature information from revising unit 420(1). Filtering engine 120 can then operate revising unit 420(2) to determine second revised feature information based at least in part on the second attention information from NCM 418(2).

In some examples, NCMs 418($\ell$), $\ell > 1$, can be operated as described above with reference to Eqs. (13) and (14). In some examples, revising units 420($\ell$), $\ell > 1$, can be operated as described above with reference to Eqs. (15) and (16). In Eqs. (13)-(16), replace ",0" subscripts with ",$\ell$," and replace ",1" subscripts with ",$\ell+1$" to adapt the equations for use in layer $\ell$. In this way, successive revised feature information values can be determined. In the depicted example, L=2, NCM 410 or transform 414 outputs $u_0$, revising unit 420(1) outputs $u_1$, and revising unit 420(2) outputs $u_2$.

In some examples, filtering engine 120 can determine the second revised feature information $u_2$ further based at least in part on at least the feature information of the query or the revised feature information. For example, in Eqs. (13)-(16), $u_2$ is determined based at least in part on $u_1$, the revised feature information (Eq. (16)). Similarly, $u_1$ is determined based at least in part on $u_0 = V_Q$, the feature information of the query (Eq. (16)).

In some examples, selecting module 240 can determine a filter output corresponding to the query based at least in part on the second revised feature information from revising unit 420(2), or based on the feature information output by revising unit 420(L). The filter output can include, e.g., an answer to the query. In some examples, the computational stages 416 are arranged in sequence, e.g., as depicted, so that the output from revising units 420($\ell$), $\ell > 2$, are determined based at least in part on the second revised feature information from revising unit 420(2).

In some examples, selecting module 240 can be configured to operate an NCM 422 to determine respective output-element values of a plurality of output elements based at least in part on the second revised feature information from revising unit 420(2), or in general from revising unit 420(L). NCM 422 can include, e.g., a logistic regression network, a single-layer perceptron, or another classifier. In some examples, the output elements are words of a predefined vocabulary, and the output-element values are scores indicating the relevance of the respective words to image data 402 and query text 406. In some examples, the output-element values are probabilities that the respective words are answers found in image data 402 to the query given in query text 406. In some examples, NCM 422 includes a single-layer perceptron operating as in Eq. (17).

$$p_{ans} = \text{softmax}(W_u u_L + b_U) \quad (17)$$

$W_u$ can be a weight matrix and $b_u$ can be a bias vector.

As discussed below with reference to Table 1, $p_{ans} \in \mathbb{R}^W$ can be, e.g., a W-element vector of output-element values, e.g., probabilities that each of the W words in a dictionary is an answer to the query. In some examples, selecting module 240 can be configured to determine the filter output by selecting at least one of the output elements based at least in part on the respective output-element values. For example, selecting module 240 can select the output element having the highest respective output-element value as the filter output.

In some examples, selecting module 240 can determine respective ranks of the output elements based at least in part on the output-element values. For example, selecting module 240 can arrange the output elements in descending order by output-element value and assign ranks 1, 2, . . . , N to the N arranged output elements, respectively. Selecting module 240 can then select the at least one of the output elements having respective ranks in a selected range, e.g., the top-ranked output element, or the top n output elements (n<N). The selected range, and other ranges described herein, can include one or more values or segments, each of which can be adjacent to, overlapping with, or disjoint from, any of the other values or segments. Example selected ranges, represented as intervals, can include: rank $\in[1]$ (only the top-ranked item); rank $\in[1,2]$ (the top two items); value $\in[0.9, 1.0)$ (values of at least 1.9, but less than 1.0); value>0.75; or value $\in([0.5,0.7) \cup (0.7,1.0])$ (values between 0.5 and 1.0, except for exactly 0.7).

In some examples, output-text-determining module 242 can determine output text based at least in part on the feature information of a terminal (e.g., last-executed) stage 416(L) of the plurality of computational stages 416. For example, the output text can include one or more words, or representations thereof. In some examples, output-text-determining module 242 can determine the output text including at least one of the output elements, as indicated by the filter output. In an example shown in Table 1, output element "dog" has the highest output-element value, thus the highest rank, and output element "red" has the second highest output-element value and thus the second-highest rank. In some examples, output-text-determining module 242 can determine the output text including only the word "dog," or including the phrase "red dog" or its constituent words.

TABLE 1

| Output Element | Output-Element Value | Rank |
|---|---|---|
| dog | 0.65 | 1 |
| cat | 0.1 | 4 |
| red | 0.30 | 2 |
| five | 0.26 | 3 |

In some examples, audio-output-determining module 244 can determine the audio-output signal corresponding to the output text. For example, audio-output-determining module 244 can operate a text-to-speech engine or other speech-synthesis engine (omitted for brevity) to produce the output audio. Speech-synthesis engines can include, e.g., concatenation, formant-based, articulatory, or other synthesis modules. Audio-output-determining module 244 can provide the audio-output signal corresponding to the output text to speaker 226. For example, Audio-output-determining module 244 can energize speaker 226 to produce the output audio.

In some examples of operation, at least one engine 116, 118, or 120 is responsive to a signal from a user-input control 312, e.g., a pushbutton, switch, audio sensor, light sensor, or other control operable by a user. In some examples, in response to actuation of the user-input control, image sensor 148 can capture image data 402, image-feature-determining module 228 can determine the feature information of the image, query-text-determining module 230 can determine the query text 406, query-feature-determining module 232 can determine the feature information of the query text 406, filtering engine 120 can determine the output text, audio-output-determining module 244 can determine the output audio, or any combination thereof. For brevity, in the illustrated example, image-feature-determining module 228 and query-feature-determining module 232 are responsive to user-input control 312, and filtering engine 120 is responsive to outputs from image-feature-determining module 228 and query-feature-determining module 232.

In some examples, at least one of the above-described operations can run autonomously, semi-autonomously, continuously, or continually. Examples include at least capturing image data 402, determining image features (module 228), determining query text 406, or determining query features (module 232).

In an example of a configuration such as that shown in FIG. 3, image data 402 can be captured in response to operation of user-input control 312. Query text 406 can be determined, e.g., in response to operation of user-input control 312 or in response to detection by query-text-determining module 230 of a predefined word to which query-text determining module 230 is configured to respond, e.g., "query" or "computer," followed by an audio signal assumed to represent the query text. Output audio can be determined and provided via speaker 226 once processing is complete.

Some examples include an image-cropping module 424, e.g., of filtering engine 120. In some examples, image-cropping module 424 processes image data 402 to provide modified or cropped image data including only portions of the image data 402 that are relevant to a query, e.g., represented by query text 406. In some examples, image-cropping module 424 receives the second attention information or, in general, attention information output by NCM 418(L). Image-cropping module 424 can then remove portions (e.g., less than all) of image data 402, or copy portions (e.g., less than all) of image data 402 to a new image. Image-cropping module 424 can rotate, scale, shear, or apply another affine, linear, or nonlinear transform to the portions of image data 402. In some examples, query text 406 represents a search query over a database of images, and image-cropping module 424 returns only the relevant portions of each image. In some examples, image-cropping module 424 or other components described herein can determine modified image data based at least in part on image data 402 and attention information, e.g., output by NCM 418(L).

In some examples, e.g., as described above with reference to training module 246, two or more of the computational models described above can be jointly trained based at least in part on training data. In some examples, at least two of NCM 410, NCM 418(1), or NCM 418(L) can be jointly trained. Joint training can improve accuracy in the mapping of image features and query features to attention information, e.g., in NCMs 418, and can in turn improve accuracy in determining filter outputs.

Figure 5:
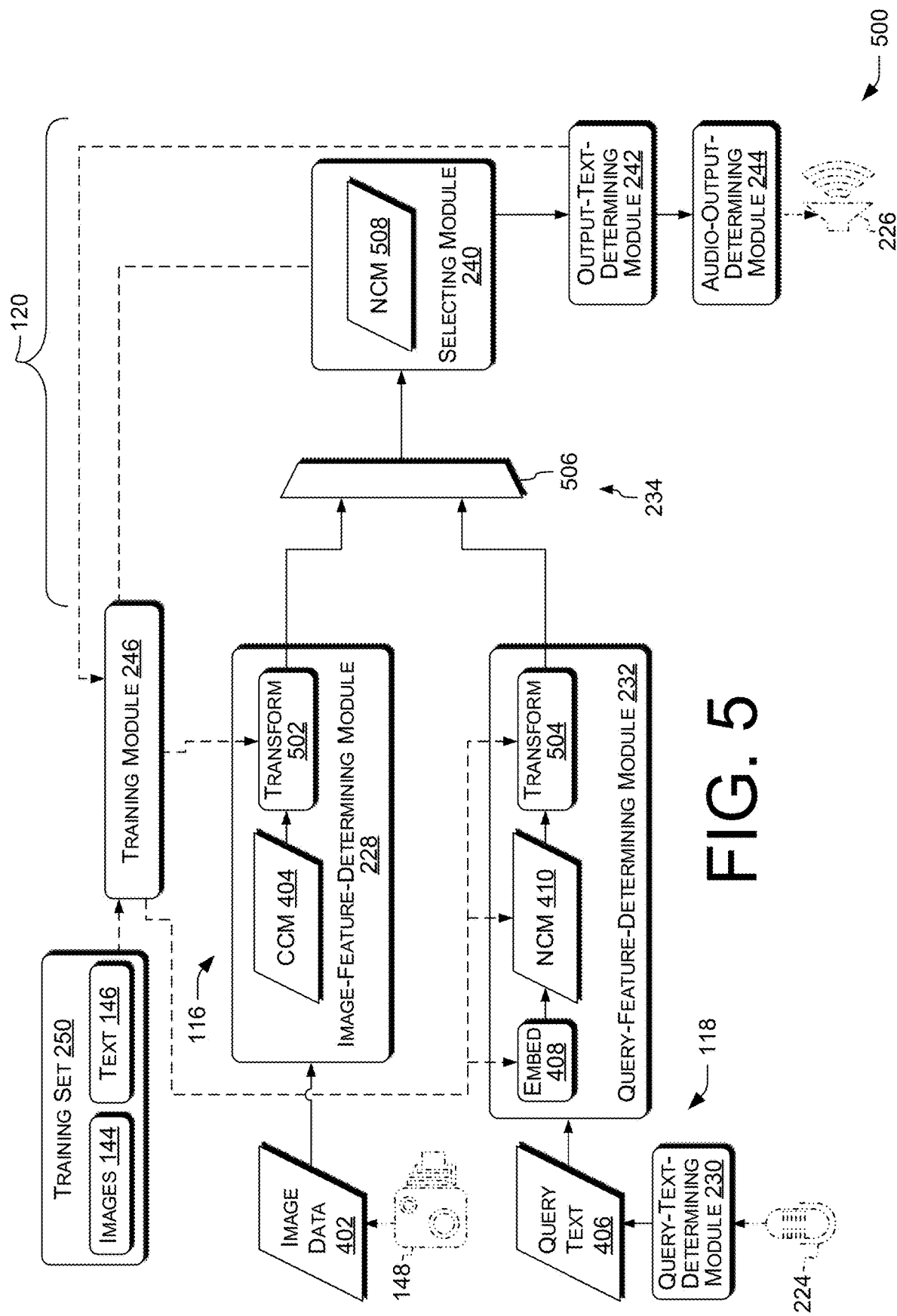
FIG. 5 is a dataflow diagram illustrating an example of image analysis including determination of a relationship between image features and query features.

FIG. 5 is a dataflow diagram 500 illustrating example interactions between the modules illustrated in FIG. 2. Further details of operations herein are described below with reference to at least FIG. 9. FIG. 5 shows dataflow related to both training and operation of computational models. Training dataflow paths are shown dashed for clarity.

In some examples, image-feature-determining module 228 can operate a convolutional computational model 404 to determine feature information of an image, e.g., of image data 402. Examples are discussed above, e.g., with reference to FIG. 4.

In some examples, query-feature-determining module 232 can operate a network computational model 410 to determine feature information of query text 406. Query-feature-determining module 232 can further use an embedding operation 408. Examples are discussed above, e.g., with reference to FIG. 4.

In some examples, image-feature-determining module 228 can operate a transform 502, or query-feature-determining module can operate a transform 504, or both. Transforms 502 and 504 can be configured or trained to transform the outputs of at least one of CCM 404 or NCM 410 to be mutually compatible. Examples are discussed above, e.g., with reference to transforms 412 and 414. The image features can be denoted $v_1$ and the query features $V_Q$, as discussed above.

In some examples, refining module 234 or another module of filtering engine 120 can determine information of a relationship between the feature information of the image and the feature information of the query text. For example, refining module 234 can determine the information of the relationship based at least in part on a difference between the feature information of the image and the feature information of the question. In some examples, refining module 234 can operate computational unit 506 to determine the information of the relationship. For example, computational unit 506 can compute the relationship $r \in \mathbb{R}^d$ as in Eq. (18), for d-dimensional feature vectors $v_1$, $v_Q$.

$$r = v_1 - v_q \tag{18}$$

In some examples, selecting module 240 can select at least one of a predetermined plurality of outputs based at least in part on the information of the relationship. For example, selecting module 240 can operate a second network computational model 508, e.g., a single- or multi-layer perceptron, based at least in part on the information of the relationship to provide output value(s) of respective output(s) of the predetermined plurality of outputs. Selecting module 240 can then select the at least one of the predetermined plurality of outputs having respective output values in a selected range. Examples are discussed above, e.g., with reference to FIG. 4 and Table 1. The output of computational model 508 can be as in Eq. (19).

$$p_{ans} = \text{softmax}(W_{mm}(v_2 - V_Q) + b_{mm}) \tag{19}$$

In some examples, training module 246 can jointly train at least two of the network computational model 410, the transform 502, the transform 504, or the second network computational model 508 based at least in part on training data. Examples are discussed above, e.g., with reference to FIG. 4. For example, output-text-determining module 242 can provide the determined output text to training module 246. Training module 246 can then use the determined output text and a corresponding label in the training data set to determine an error signal, and conduct backpropagation or other training based on the error signal.

Figure 6:
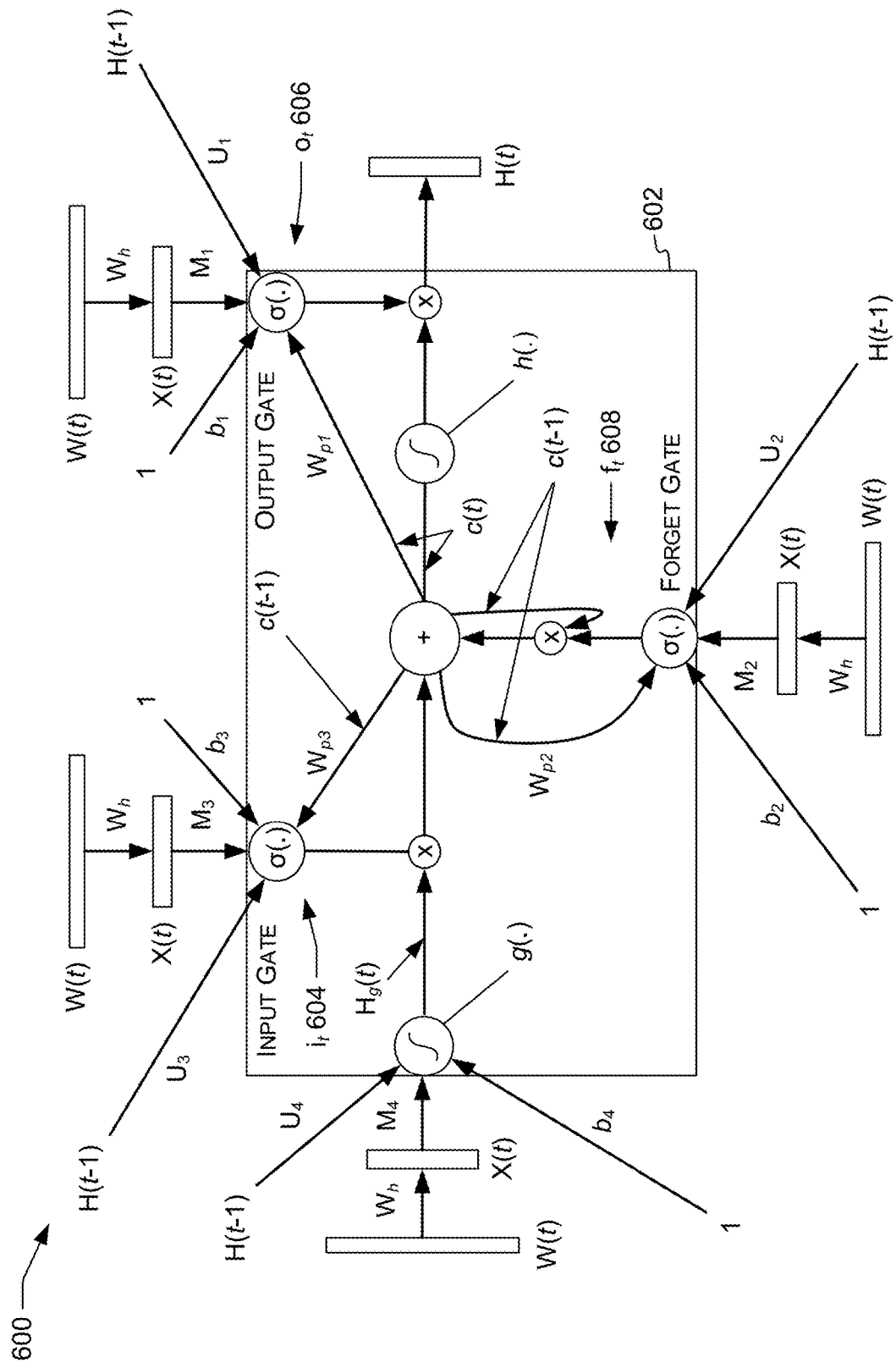
FIG. 6 is a dataflow diagram depicting an example architecture of a long short term memory cell that can be used in neural networks according to various examples described herein.

FIG. 6 is a dataflow diagram depicting an example architecture 600 of a long short term memory cell 602 that can be used in an RCM, e.g., NCM 410, FIG. 4. In various examples, the LSTM cell in an RNN-LSTM model can be used to replace the activation function (e.g., non-linear activation function) of the RNN described above.

In some examples, the LSTM architecture 600 can comprise a cell 602, an input gate $i_t$ 604, an output gate $o_t$ 606, and a forget gate $f_t$ 608. As depicted in FIG. 5, the cell state of the LSTM cell 602 can be represented as vector $c_t$.

In various examples, the gates can be trained to selectively pick what the cell 602 should remember, via input gate $i_t$ 604, pass on via the output gate $o_t$ 606, and forget via the forget gate $f_t$ 608. In some examples, the input gate $i_t$ 604, the output gate $o_t$ 606, and the forget gate $f_t$ 608 can each be trained by a respective neural network (e.g., non-linear transformation). In various examples, the training may be facilitated by applying a stochastic gradient descent (SGD) algorithm, and/or by applying a different algorithm.

The input gate $i_t$ 604, the output gate $o_t$ 606, and the forget gate $f_t$ 608, may comprise respective parameters that are trained to give a desired result. In various examples, the input gate $i_t$ 604 parameter may evolve in such a way that it attenuates unimportant information from an input. In such examples, one or more of the input gate $i_t$ 604 parameter, the output gate $o_t$ 606 parameter, and the forget gate $f_t$ 608 parameter may reduce the effect of unimportant features in a representation H(t) of the input.

Additionally and/or alternatively, one or more of the input gate $i_t$ 604 parameter, the output gate $o_t$ 606 parameter, and the forget gate $f_t$ 608 parameter may be trained to detect and emphasize important information in the input. The parameters can be trained via supervised learning, e.g., as described below with reference to FIG. 6.

In various examples, the LSTM cell 602 may comprise peephole connections, depicted in FIG. 5 as $W_{p1}$, $W_{p2}$, and $W_{p3}$. In such examples, the LSTM cell 602 may comprise a connection to a current cell state $c_t$. Additionally, the LSTM cell 602 may comprise input connections $W_i$, recurrent connections $W_{reci}$, and bias values $b_i$ for i=1, 2, 3, 4.

The LSTM architecture 600 may apply functions g(•), h(•), and σ(•) to various vectors. In various examples, g(•) and h(•) may comprise tan h(•) functions, and σ(•) may comprise a sigmoid function.

As illustrated in FIG. 6, the forward pass for an LSTM-RNN model can be represented as in Eqs. (20)-(25), where) (∘) denotes a Hadamard (element-wise) product.

$$H_g(t) = g(M_4 1_1(t) + U_4 H(t-1) + b_4) \tag{20}$$

$$i(t) = \sigma(M_3 X(t) + U_3 H(t-1) + W_{p3} c(t-1) + b_3) \tag{21}$$

$$f(t) = \sigma(M_2 X(t) + U_2 H(t-1) + W_{p2} c(t-1) + b_2) \tag{22}$$

$$c(t) = f(t) \circ c(t-1) + i(t) \circ H_g(t) \tag{23}$$

$$o(t) = \sigma(M_1 X(t) + U_1 H(t-1) + W_{p1} c(t) + b1) \tag{24}$$

$$H(t) = o(t) \circ h(c(t)) \tag{25}$$

Illustrative Processes

Figure 7:
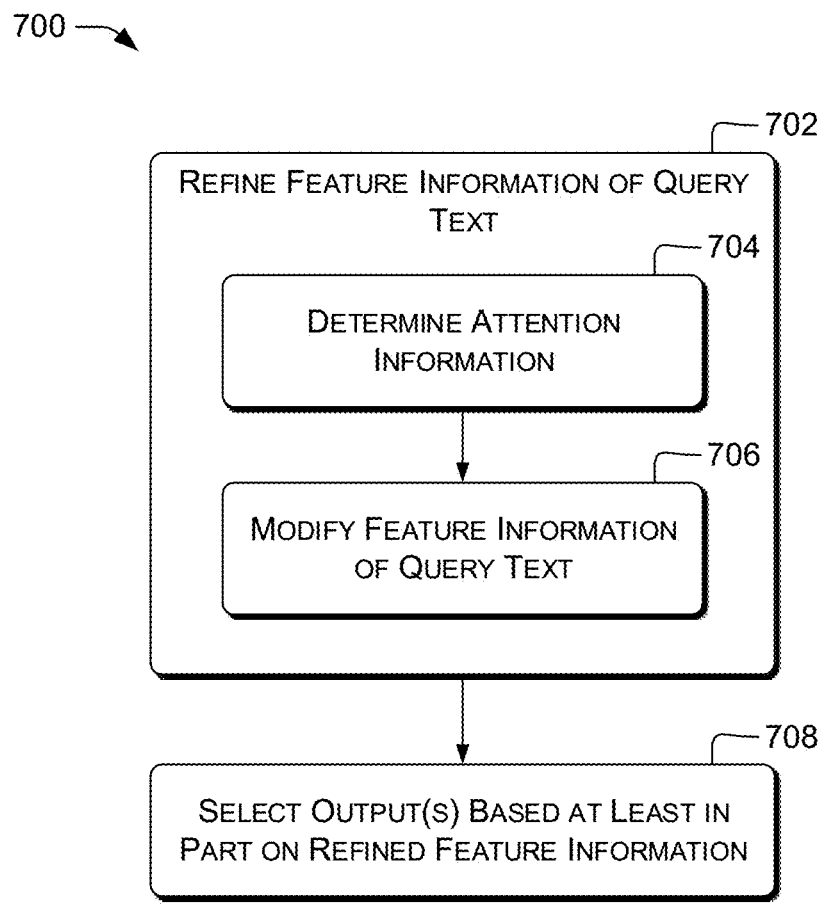
FIG. 7 is a flow diagram depicting an example image-analysis routine, e.g., including operations shown in FIG. 4.
Figure 8:
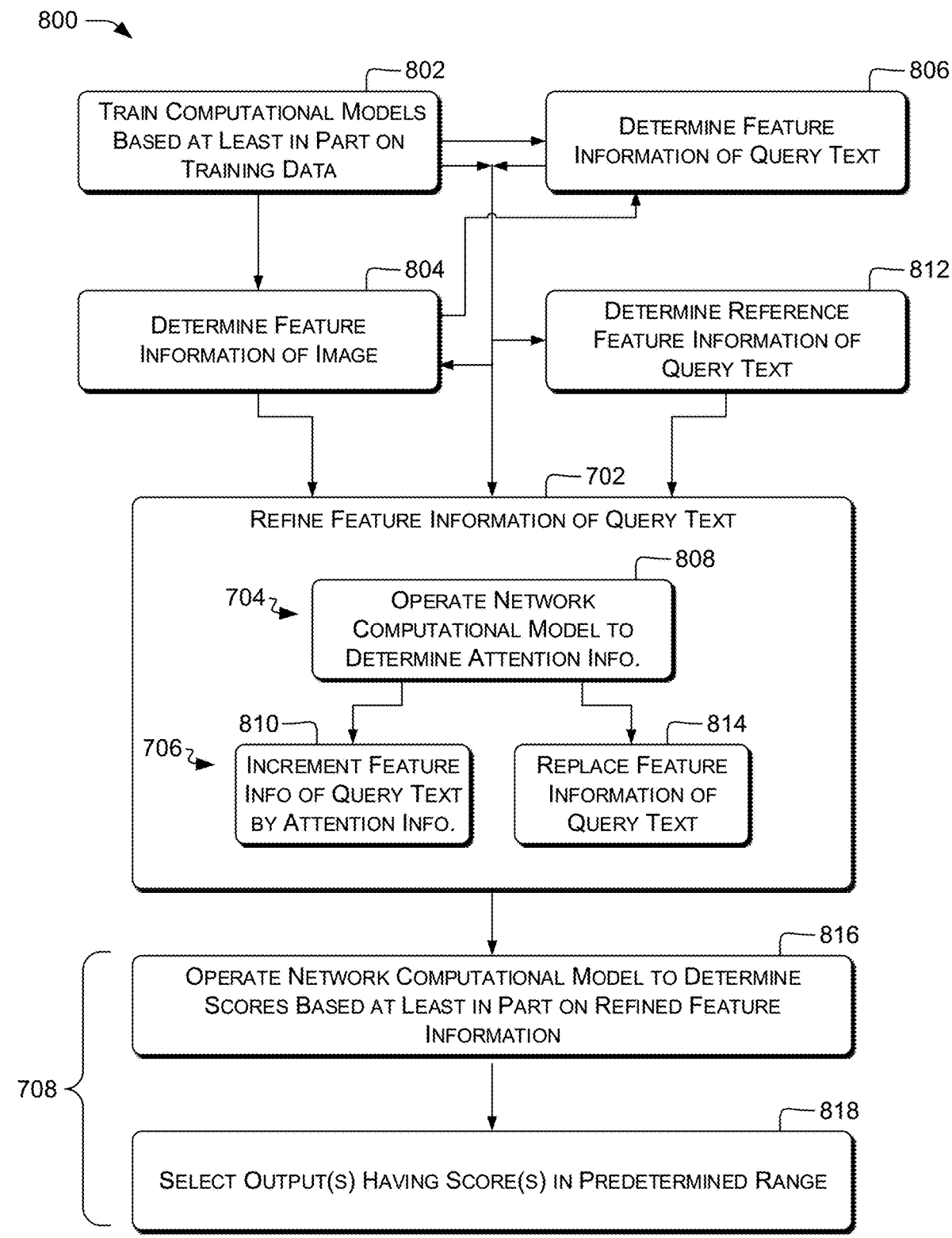
FIG. 8 is a flow diagram depicting example model-training and image-analysis routines.
Figure 9:
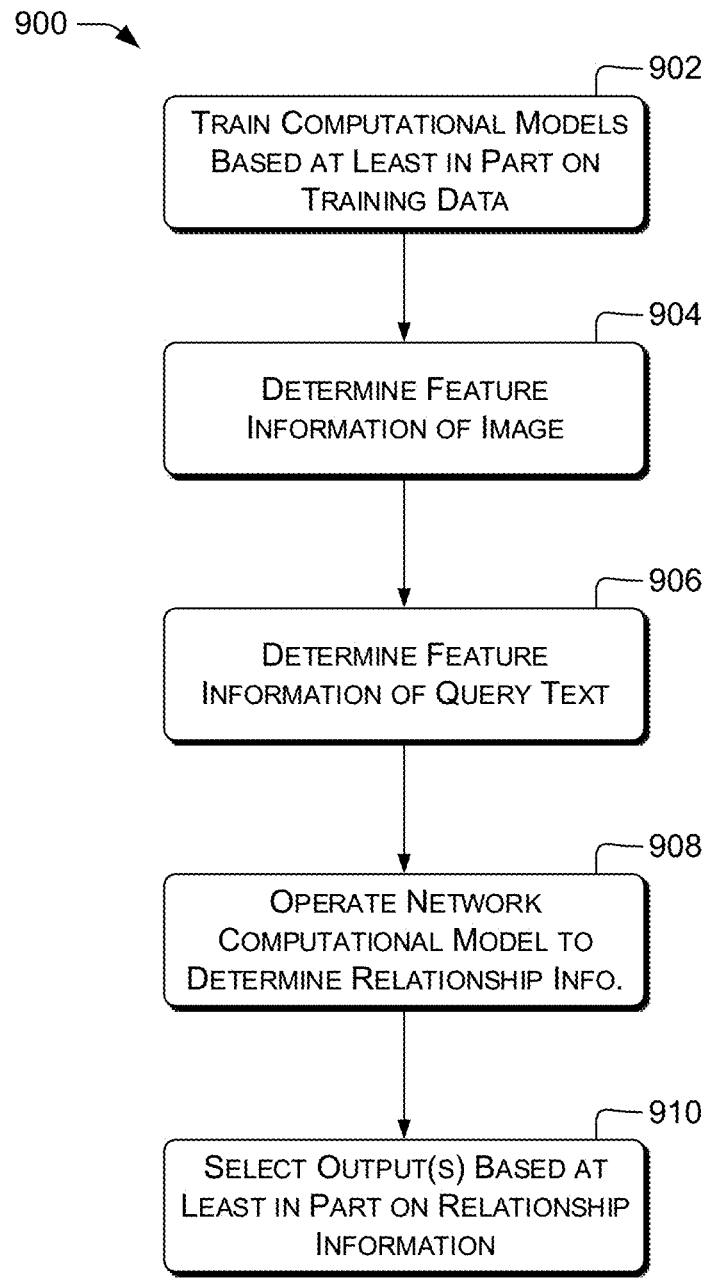
FIG. 9 is a flow diagram depicting example model-training and image-analysis routines, e.g., including operations shown in FIG. 5.

FIGS. 7-9 are flow diagrams depicting examples of processing image data, e.g., to determine answers to queries. The operations of the routines disclosed herein are not necessarily presented in any particular order and that performance of some or all of the operations in an alternative order(s) is possible and is contemplated. The operations have been presented in the demonstrated order for ease of description and illustration. Operations can be added, omitted, and/or performed simultaneously, without departing from the scope of the appended claims.

Some or all operations of the routines, and/or substantially equivalent operations, can be performed by execution of computer-executable instructions included on computer-readable media, as defined herein. The term "computer-executable instructions," and variants thereof, as used in the description and claims, is used expansively herein to include routines, applications, application modules, program modules, programs, components, data structures, algorithms, and the like. For example, methods depicted in the below flow diagrams can be carried out, e.g., under control of a processor such as processing unit(s) 108.

Thus, it should be appreciated that the logical operations described herein are implemented (1) as a sequence of computer implemented acts or program modules running on a computing system and/or (2) as interconnected machine logic circuits or circuit modules within the computing system. The example is a matter of choice dependent on the performance and other requirements of the computing system. Accordingly, the logical operations described herein are referred to variously as states, operations, structural devices, acts, or modules. These operations, structural devices, acts, and modules can be implemented in software, in firmware, in special purpose digital logic, and any combination thereof. For clarity of explanation, reference is herein made to various components shown in FIGS. 1-6 that can carry out or participate in the steps of the exemplary method. It should be noted, however, that other components can be used; that is, exemplary method(s) shown in FIGS. 7-9 are not limited to being carried out by the identified components.

FIG. 7 depicts an example method 700 of analyzing an image. The image can, e.g., include, correspond to, or be represented by or in the form of, image data 402. FIG. 4 shows components useful in implementing method 700 in some examples.

At block 702, feature information of query text can be refined. The refining comprises performing a group of actions at least twice, and the group of actions comprises blocks 704 and 706.

At block 704, attention information can be determined based at least in part on feature information of the image and the feature information of the query text. Examples are discussed above, e.g., with reference to NCMs 418 of computational stages 416, FIG. 4, and attention-determining module 236, FIG. 2.

At block 706, the feature information of the query text can be modified based at least in part on the attention information. Examples are discussed above, e.g., with reference to revising units 420 of computational stages 416, FIG. 4, and modifying module 238, FIG. 2.

At block 708, at least one of a predetermined plurality of outputs can be selected based at least in part on the refined feature information of the query text. Examples are discussed above, e.g., with reference to selecting module 240 and output-text-determining module 242, FIGS. 2 and 4. The selected output(s) can correspond to the query text. For example, the selected output(s) can include an ordered or unordered collection of word(s) answering the query.

FIG. 8 depicts an example method 800 of analyzing an image. FIG. 4 shows components useful in implementing method 800 in some examples. Blocks 804 or 806 can be carried out before refining the feature information of the query text at block 702. Either of blocks 804 and 806 can be performed before or concurrently with the other.

At block 802, a plurality of computational models are jointly trained based at least in part on training data. In some examples, the computational models include at least NCM 410 (a first network computational model), NCM 418(1) (a second network computational model), and NCM 418(L) (a third network computational model). Examples are discussed above, e.g., with reference to training module 246, FIGS. 2 and 4. Block 802 can be carried out, e.g., at least before deploying a trained system such as that shown in FIG. 4, or after deploying, or on an ongoing basis. Block 802 can be followed by at least one of blocks 804, 806, 808, or 702. Either of blocks 804 and 806 can be performed before or concurrently with the other.

In some examples, training can be performed using the Theano package for PYTHON, or another symbolic/numerical equation solver. In an example using Theano, equations are defined symbolically in PYTHON code using Theano functions. Any or all of Eqs. (1)-(25) can be expressed in a Theano symbolic representation. A cost function can be defined that computes a difference between the training data and a prediction output from the Theano expression of the model. The Theano "grad" subroutine can then be called to symbolically determine the gradient of the cost function. The Theano "function" subroutine can be called to define a learning-step function that will update the model parameters based on the gradient of the cost function, e.g., according to a gradient-descent algorithm, and return the value of the cost function with the new parameters. To train the model, the learning-step function can be repeatedly called until convergence criteria are met. For example, the learning-step function can be given as input a randomly-selected mini-batch of the training data at each call in order to train the model according to stochastic gradient descent (SGD) techniques. In some examples, Theano can be used to jointly train computational models, as described above, using SGD with momentum 0.9 or a batch size of 100. Grid search can be used to select the learning rate for training, e.g., by performing training at each of a plurality of learning rates within a predetermined range (e.g., 0.0001, 0.001, 0.01, and 0.1). Alternatively, models can be trained using various learning rates and the model best satisfying acceptance criteria, e.g., of accuracy, precision, or training time, can be selected. Example learning rates can include 0.1, 0.01, or 0.001. Gradient-clipping or dropouts can be used during training. For example, when the numerical value of the gradient exceeds a selected threshold, the gradient can be clipped at the selected threshold.

At block 804, the feature information of the image can be determined by applying a convolutional computational model to data of the image. Examples are discussed above, e.g., with reference to image data 402, at least one of CCM 404 or transform 412, FIG. 4, and image-feature-determining module 228, FIGS. 2 and 4.

At block 806, the feature information of the query text can be determined by applying a network computational model to the query text. Examples are discussed above, e.g., with reference to query text 406, at least one of embedding operation 408, NCM 410, or transform 414, FIG. 4, and query-feature-determining module 232, FIGS. 2 and 4. Block 806 can be followed by block 812, discussed below, or block 702, which can include block 704.

In some examples, block 704 can include block 808. At block 808, a network computational model such as NCM 418 can be operated to determine the attention information. NCM 418 can have as input the feature information of the image and the feature information of the query text. Examples are discussed above, e.g., with reference to Eqs. (1)-(12).

In some examples, block 706 can include block 810. At block 810, the feature information of the query text can be incremented by the attention information or by a value computed from the attention information in order to modify the feature information of the query text. Examples are discussed above, e.g., with reference to Eqs. (13)-(16).

In some examples, block 812 precedes block 702. At block 812, the feature information of the query text can be copied to determine reference feature information of the query text. As noted above, modification of the feature information of the query text can be carried out by mutating a single copy of the feature information of the query text, or by creating successive versions of the query text (e.g., $u_t$, Eq. (16)). In examples of the former, block 812 can include saving a copy of the feature information of the query text before that information is modified. In examples of the latter, block 812 can include saving a reference to the original version of the feature information of the query text (e.g., $u_0=V_Q$, Eq. (13)).

In some examples using block 812, block 706 can include block 814. At block 814, the feature information of the query text can be replaced with a sum or concatenation of the reference feature information of the query text and the attention information, or a value computed from the sum or concatenation, in order to modify the feature information of the query text. Examples are discussed above, e.g., with reference to Eqs. (15) and (16).

In some examples, block 708 can include blocks 816 or 818.

At block 816, a network computational model can be operated to determine respective scores for individual outputs of the plurality of outputs based at least in part on the refined feature information of the query text. Examples are discussed above, e.g., with reference to Eq. (17).

At block 818, at least one of the plurality of outputs can be selected, namely, output(s) having respective score(s) in a predetermined range. Examples are discussed above, e.g., with reference to Table 1.

FIG. 9 depicts an example method 900 of analyzing an image. FIG. 5 shows components useful in implementing method 900 in some examples.

At block 902, a network computational model, e.g., NCM 410, and a second network computational model, e.g., NCM 508, are trained based at least in part on training data. Examples are discussed above, e.g., with reference to training module 246, FIG. 5. Block 904 can be carried out, e.g., at least before deploying a trained system such as that shown in FIG. 5, or after deploying, or on an ongoing basis.

In some examples, training can be carried out using techniques discussed above with reference to block 802. For example, Eqs. (18) and (19) can be represented in a symbolic form using Theano, an update function can be defined using the gradient provided by the "grad" subroutine, and training can be carried out, e.g., using SGD.

At block 904, a convolutional computational model can be operated to determine feature information of an image. Examples are discussed above, e.g., with reference to image-feature-determining module 228, CCM 404, or transform 502, FIG. 5.

At block 906, a network computational model can be operated to determine feature information of query text. Examples are discussed above, e.g., with reference to query-feature-determining module 232, NCM 410, or transform 504, FIG. 5.

At block 908, information can be determined of a relationship between the feature information of the image and the feature information of the query text. Examples are discussed above, e.g., with reference to computational unit 506 and refining module 234, FIG. 5. For example, the information of the relationship can be determined based at least in part on a difference between the feature information of the image and the feature information of the question. The difference can be, e.g., an element-wise vector difference, such as that shown in Eq. (18).

At block 910, at least one of a predetermined plurality of outputs can be selected based at least in part on the information of the relationship. In some examples, block 910 can include operating a second network computational model, e.g., NCM 508, based at least in part on the information of the relationship to provide output value(s) of respective output(s) of the predetermined plurality of outputs. Block 910 can further include selecting the at least one of the predetermined plurality of outputs having respective output values in a selected range. Examples are discussed above, e.g., with reference to selecting module 240, FIGS. 2, 4, and 5.

Example of Image Analysis

Figure 10A:
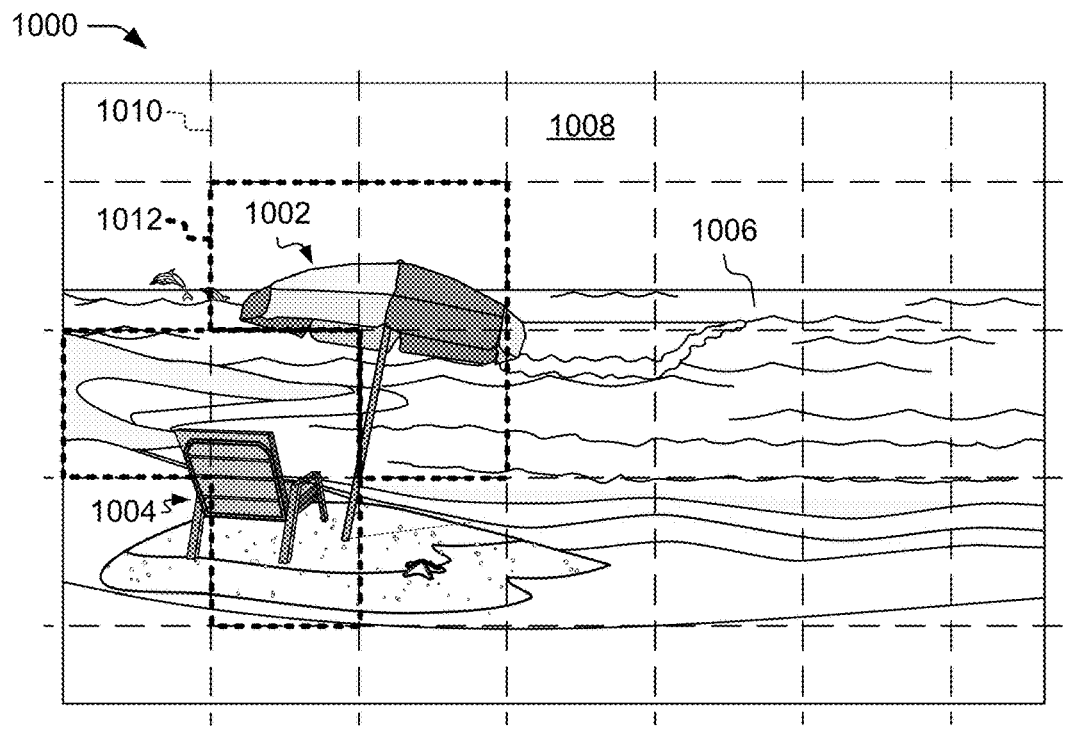
FIG. 10A is a graphical representation of an earlier stage of processing of an image.
Figure 10B:
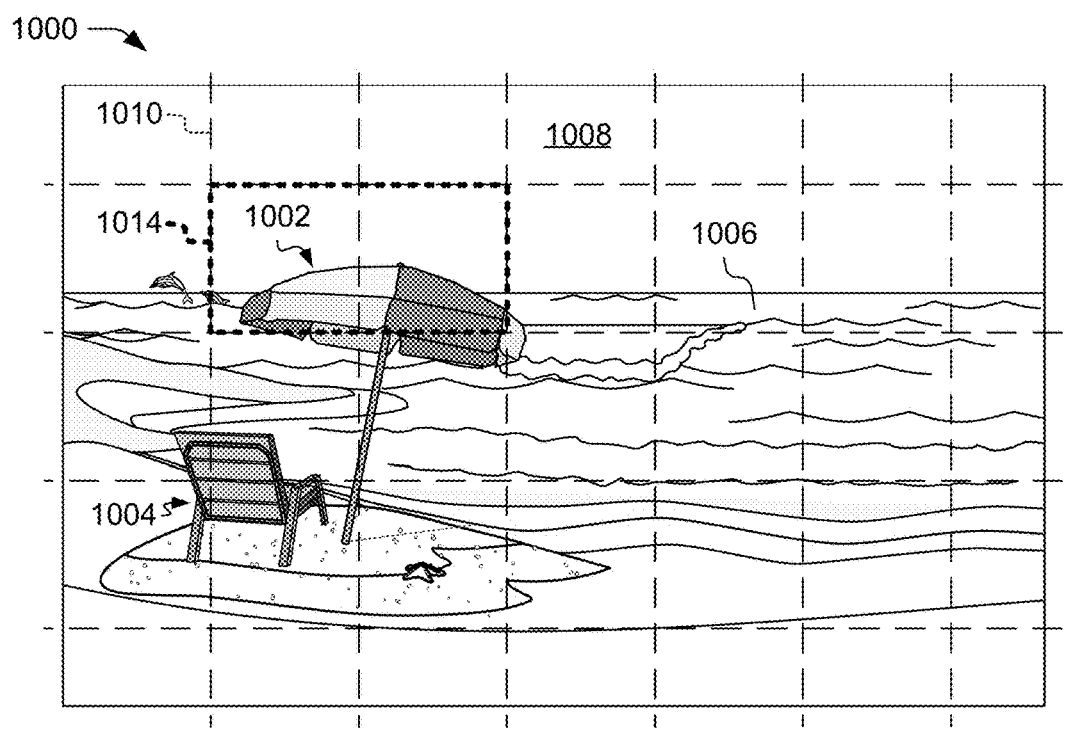
FIG. 10B is a graphical representation of a later stage of processing of the image of FIG. 10A.

FIGS. 10A and 10B show a simulated example of attention-based image analysis of an image 1000 of scene 150, FIG. 1. Image 1000 depicts a beach scene in which a beach umbrella 1002 is to the right of a beach chair 1004 when facing the sea 1006. In this example, the query is "what is next to the chair on the empty beach?" and the answer is umbrella 1002. The majority of the image content is either sea 1006 or sky 1008, so a system that considered, e.g., only the average of pixel values in the image would not be able to identify umbrella 1002 as an answer to the query.

FIG. 10A graphically represents the output of NCM 418(1), FIG. 4. NCM 418(1) in this example outputs a vector having a scalar value for each of a plurality of regions of the image, e.g., a regular grid of regions. The scalar values are correlated with the relevance of the respective regions to the query. Region boundaries 1010 are depicted as dashed lines. Heavy, stippled outlines 1012 surround regions having scalar values above a selected threshold. As shown, image regions depicting the umbrella 1002 and the chair 1004 have such scalar values, indicating those image regions are relevant to the query (relevance being defined by the trained computational models).

FIG. 10B graphically represents the output of NCM 418(L), FIG. 4, under the same assumptions described in the previous paragraph. Heavy, stippled outlines 1014 surround regions having scalar values above a selected threshold, in this example. As shown, the image regions depicting the chair 1004 no longer have such scalar values, but the image regions depicting the umbrella 1002 do have such scalar values. This is referred to as focusing of attention.

In this example, as a result of focusing of attention, the second revised feature information from revising unit 420 (L), FIG. 4, compared to the feature information of the query, will be more highly correlated with image content of umbrella 1002, inside of outlines 1014, than with other parts of the image 1000, outside of outlines 1014. Therefore, NCM 422, FIG. 4, will receive as input the second revised feature information having reduced noise from image features other than the umbrella 1002, which is the answer to the query. NCM 422 will therefore output higher values for "umbrella" than other terms, e.g., according to Eq. (17). This, in turn, will permit output-text-determining module 242 to determine the answer "umbrella" to the query "what is next to the lounge chair on the empty beach?"

Example Clauses

A: A device, comprising: at least one processing unit adapted to execute modules; and one or more computer-readable media communicatively coupled to the at least one processing unit and having thereon at least one of the modules, the at least one of the modules comprising: a module of an image-representation engine that is configured to operate a convolutional computational model (CCM) to determine feature information of an image; a module of a query-representation engine that is configured to operate a first network computational model to determine feature information of a query; and a module of a filtering engine that is configured to: operate a second network computational model to determine first attention information based at least in part on the feature information of the image and the feature information of the query; determine revised feature information based at least in part on the first attention information and the feature information of the query; operate a third network computational model to determine second attention information based at least in part on the feature information of the image and the revised feature information; determine second revised feature information based at least in part on the second attention information; and determine a filter output corresponding to the query based at least in part on the second revised feature information.

B: A device as paragraph A recites, wherein the filtering engine is configured to determine the second revised feature information further based at least in part on at least the feature information of the query or the revised feature information.

C: A device as paragraph A or B recites, wherein the filtering engine is configured to: operate a fourth network computational model to determine respective output-element values of a plurality of output elements based at least in part on the second revised feature information; and determine the filter output by selecting at least one of the output elements based at least in part on the respective output-element values.

D: A device as paragraph C recites, wherein the filtering engine is configured to: determine respective ranks of the output elements based at least in part on the output-element values; and select the at least one of the output elements having respective ranks in a selected range.

E: A device as any of paragraphs A-D recites, further comprising jointly training at least the first network computational model, the second network computational model, and the third network computational model based at least in part on training data.

F: A device as any of paragraphs A-E recites, further comprising determining modified image data based at least in part on image data of the image and on the second attention information.

G: A method of analyzing an image, the method comprising: refining feature information of query text, wherein the refining comprises performing a group of actions at least twice, and the group of actions comprises: determining attention information based at least in part on feature information of the image and the feature information of the query text; and modifying the feature information of the query text based at least in part on the attention information; and selecting at least one of a predetermined plurality of outputs based at least in part on the refined feature information of the query text.

H: A method as paragraph G recites, further comprising, before refining the feature information of the query text: determining the feature information of the image by applying a convolutional computational model to data of the image; and determining the feature information of the query text by applying a network computational model to the query text.

I: A method as paragraph G or H recites, wherein the determining the attention information comprises operating a network computational model having as input the feature information of the image and the feature information of the query text.

J: A method as any of paragraphs G-I recites, wherein the modifying the feature information of the query text comprises incrementing the feature information of the query text by the attention information or by a value computed from the attention information.

K: A method as any of paragraphs G-J recites, wherein: the method further comprises, before the refining, copying the feature information of the query text to determine reference feature information of the query text; and the modifying the feature information of the query text comprises replacing the feature information of the query text with a sum or concatenation of the reference feature information of the query text and the attention information, or a value computed from the sum or concatenation.

L: A method as any of paragraphs G-K recites, wherein the selecting comprises: operating a network computational model to determine respective scores for individual outputs of the plurality of outputs based at least in part on the refined feature information of the query text; and selecting the at least one of the plurality of outputs having respective scores in a predetermined range.

M: A method as any of paragraphs G-L recites, further comprising capturing the image in response to actuation of the user-input control.

N: A system comprising: a microphone configured to provide an audio-input signal; a speaker configured to receive an audio-output signal and produce corresponding output audio; at least one processor; and a memory storing instructions that, when executed by the at least one processor, cause the at least one processor to perform operations comprising: determining query text corresponding to the audio-input signal; operating a network computational model to determine feature information of the query text; operating a convolutional computational model (CCM) to determine feature information of an image; operating a first computational stage of a plurality of computational stages to determine feature information of the first computational stage based at least in part on the feature information of the query text and the feature information of the image; operating at least one subsequent stage of the plurality of computational stages to determine feature information of that stage based at least in part on the feature information of the image and the feature information of a respective preceding stage of the plurality of computational stages; determining output text based at least in part on the feature information of a terminal stage of the plurality of computational stages; and determining the audio-output signal corresponding to the output text.

O: A system as paragraph N recites, further comprising an image sensor configured to provide the image.

P: A system as paragraph O recites, further comprising a mount configured to retain the image sensor in position with respect to at least the body or clothing of a user.

Q: A system as paragraph P recites, wherein the image sensor is configured to provide the image of an area not visible to the user.

R: A system as any of paragraphs N-Q recites, further comprising a user-input control, wherein the operations further comprise determining at least the feature information of the image or the feature information of the query text, determining the output text, and determining the output audio in response to actuation of the user-input control.

S: A system as any of paragraphs N-R recites, wherein the operations to operate the at least one subsequent stage comprise instructions to operate individual ones, or each, of a predetermined number of subsequent stages.

T: A computer-executable method, comprising: operating a convolutional computational model to determine feature information of an image; operating a network computational model to determine feature information of query text; determining information of a relationship between the feature information of the image and the feature information of the query text; and selecting at least one of a predetermined plurality of outputs based at least in part on the information of the relationship.

U: A computer-executable method as paragraph T recites, further comprising determining the information of the relationship based at least in part on a difference between the feature information of the image and the feature information of the question.

V: A computer-executable method as paragraph T or U recites, further comprising operating a second network computational model based at least in part on the information of the relationship to provide output value(s) of respective output(s) of the predetermined plurality of outputs; wherein the selecting comprises selecting the at least one of the predetermined plurality of outputs having respective output values in a selected range.

W: A computer-executable method as paragraph V recites, further comprising jointly training the network computational model and the second network computational model based at least in part on training data.

X: A computer-readable medium, e.g., a computer storage medium, having thereon computer-executable instructions, the computer-executable instructions upon execution configuring a computer to perform operations as any of paragraphs G-M recites.

Y: A device comprising: a processor; and a computer-readable medium, e.g., a computer storage medium, having thereon computer-executable instructions, the computer-executable instructions upon execution by the processor configuring the device to perform operations as any of paragraphs G-M recites.

Z: A system comprising: means for processing; and means for storing having thereon computer-executable instructions, the computer-executable instructions including means to configure the system to carry out a method as any of paragraphs G-M recites.

AA: A computer-readable medium, e.g., a computer storage medium, having thereon computer-executable instructions, the computer-executable instructions upon execution configuring a computer to perform operations as any of paragraphs T-W recites.

AB: A device comprising: a processor; and a computer-readable medium, e.g., a computer storage medium, having thereon computer-executable instructions, the computer-executable instructions upon execution by the processor configuring the device to perform operations as any of paragraphs T-W recites.

AC: A system comprising: means for processing; and means for storing having thereon computer-executable instructions, the computer-executable instructions including means to configure the system to carry out a method as any of paragraphs T-W recites.

CONCLUSION

Various computational-model training and operation techniques described herein can permit more efficiently analyzing image data, and more readily determining answers to queries relating to the image data. Various examples permit users to access information represented in the form of image data, even in the absence of visual access to depictions of that image data. For example, some examples herein can permit visually-impaired users to access image information via audible signals, e.g., speech. Some examples herein can permit users who do not have access to displays, or are not able to focus on those displays, to access image information via audible signals. Various examples can provide more effective training of multiple computational models, providing improved accuracy compared to prior schemes. Various examples operate multiple neural networks, permitting the operation of those neural networks to be carried out in parallel. This parallel operation can permit operating the neural network with reduced computational load and memory requirements compared to operating a monolithic neural network. Various examples provided modified or cropped image data including only portions of an original image that are relevant to a query.

Although the techniques have been described in language specific to structural features and/or methodological acts, it is to be understood that the appended claims are not necessarily limited to the features and/or acts described. Rather, the features and acts are described as example implementations of such techniques. For example, network 104, processing unit(s) 108, and other structures described herein for which multiple types of implementing devices or structures are listed can include any of the listed types, and/or multiples and/or combinations thereof.

The operations of the example processes are illustrated in individual blocks and summarized with reference to those blocks. The processes are illustrated as logical flows of blocks, each block of which can represent one or more operations that can be implemented in hardware, software, and/or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions and/or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 106, 128, and/or 200 such as one or more internal and/or external CPUs and/or GPUs, and/or one or more pieces of hardware logic such as FPGAs, DSPs, and/or other types described above.

All of the methods and processes described above can be embodied in, and fully automated via, software code modules executed by one or more general purpose computers and/or processors. The code modules can be stored in any type of computer-readable storage medium and/or other computer storage device. Some and/or all of the methods can be embodied in specialized computer hardware.

Conditional language such as, among others, "can," "could," "might" and/or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples and/or that one or more examples necessarily include logic for deciding, with and/or without user input and/or prompting, whether certain features, elements and/or steps are included and/or are to be performed in any particular example. The word "or" is used herein in an inclusive sense unless specifically stated otherwise. Accordingly, conjunctive language such as the phrases "X, Y, or Z" or "at least one of X, Y or Z," unless specifically stated otherwise, is to be understood as signifying that an item, term, etc., can be either X, Y, or Z, or a combination thereof.

Any routine descriptions, elements and/or blocks in the flow diagrams described herein and/or depicted in the attached figures should be understood as potentially representing modules, segments, and/or portions of code that include one or more executable instructions for implementing specific logical functions and/or elements in the routine. Alternative implementations are included within the scope of the examples described herein in which elements and/or functions can be deleted and/or executed out of order from any order shown or discussed, including substantially synchronously and/or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise.

What is claimed is:

1. A device, comprising:
    at least one processing unit adapted to execute modules configured to answer natural-language queries about content depicted in images; and
    one or more computer-readable media communicatively coupled to the at least one processing unit and storing the modules, the modules comprising:
    a module of an image-representation engine that is configured to operate a convolutional computational model (CCM) to determine feature information of an image, the feature information comprising feature values for a plurality of image regions within the image;
    a module of a query-representation engine that is configured to operate a first network computational model to determine feature information of a natural-language query; and
    a module of a filtering engine that is configured to:
    operate a second network computational model to determine first attention information based at least in part on the feature information of the image and the feature information of the query, the first attention information representing a relevance of each of the plurality of image regions to the query;
    determine revised feature information based at least in part on the feature values for the plurality of image regions, weighted by the first attention information, and the feature information of the query;
    operate a third network computational model to determine second attention information based at least in part on the feature information of the image and the revised feature information, the second attention information representing a revised relevance of each of the plurality of image regions to the query;
    determine second revised feature information based at least in part on the feature values of the plurality of image regions, weighted by the second attention information; and
    determine, as an answer to the query, a natural-language filter output based at least in part on the second revised feature information.

2. A device as claim 1 recites, wherein the filtering engine is configured to determine the second revised feature information further based at least in part on at least the feature information of the query or the revised feature information.

3. A device as claim 1 recites, wherein the filtering engine is configured to:
    operate a fourth network computational model to determine respective output-element values of a plurality of output elements based at least in part on the second revised feature information; and
    determine the filter output by selecting at least one of the output elements based at least in part on the respective output-element values.

4. A device as claim 3 recites, wherein the filtering engine is configured to:
    determine respective ranks of the output elements based at least in part on the output-element values; and
    select the at least one of the output elements having respective ranks in a selected range.

5. A device as claim 1 recites, further comprising jointly training at least the first network computational model, the second network computational model, and the third network computational model based at least in part on training data.

6. A method of analyzing an image to answer a natural-language query about content depicted in the image, the method comprising:
    refining feature information of query text of the natural-language query, wherein the refining comprises performing a group of actions at least twice, and the group of actions comprises:
    determining attention information based at least in part on feature information of the image and the feature information of the query text, the feature information of the image comprising feature values for a plurality of image regions within the image, and the attention information representing a relevance of each of the plurality of image regions to the query; and
    modifying the feature information of the query text based at least in part on the feature values for the plurality of image regions weighted by the attention information; and
    selecting, as an answer to the query, at least one of a predetermined plurality of natural-language outputs based at least in part on the refined feature information of the query text.

7. A method as claim 6 recites, further comprising, before refining the feature information of the query text:
    determining the feature information of the image by applying a convolutional computational model to data of the image; and
    determining the feature information of the query text by applying a network computational model to the query text.

8. A method as claim 6 recites, wherein the determining the attention information comprises operating a network computational model having as input the feature information of the image and the feature information of the query text.

9. A method as claim 6 recites, wherein the modifying the feature information of the query text comprises incrementing the feature information of the query text by feature information of the plurality of image regions weighted by the attention information.

10. A method as claim 6 recites, wherein:
the method further comprises, before the refining, copying the feature information of the query text to determine reference feature information of the query text; and
the modifying the feature information of the query text comprises replacing the feature information of the query text with a sum or concatenation of the reference feature information of the query text and feature information of the image regions weighted by the attention information.

11. A method as claim 6 recites, wherein the selecting comprises:
operating a network computational model to determine respective scores for individual outputs of the plurality of outputs based at least in part on the refined feature information of the query text; and
selecting the at least one of the plurality of outputs having respective scores in a predetermined range.

12. A system for answering natural-language queries about content depicted in images, the system comprising:
a microphone configured to provide an audio-input signal;
a speaker configured to receive an audio-output signal and produce corresponding output audio;
at least one processor; and
a memory storing instructions that, when executed by the at least one processor, cause the at least one processor to perform operations comprising:
determining query text corresponding to the audio-input signal;
operating a network computational model to determine feature information of the query text;
operating a convolutional computational model (CCM) to determine feature information of an image, the feature information of the image comprising feature values for a plurality of image regions within the image;
operating a first computational stage of a plurality of computational stages to determine, based at least in part on the feature information of the query text and the feature information of the image, first attention information representing a relevance of each of the plurality of image regions to the query, and to determine feature information of the first computational stage based at least in part on the feature information of the query text and the feature information of the image weighted by the attention information;
operating at least one subsequent stage of the plurality of computational stages to determine, based at least in part on the feature information of a respective preceding stage of the plurality of stages, subsequent attention information, and to determine feature information of that stage based at least in part on the feature information of the image, weighted by the subsequent attention information, and on the feature information of a respective preceding stage of the plurality of computational stages;
determining, as an answer to the query, output text based at least in part on the feature information of a terminal stage of the plurality of computational stages; and
determining the audio-output signal corresponding to the output text.

13. A system as claim 12 recites, further comprising an image sensor configured to provide the image.

14. A system as claim 13 recites, further comprising a mount configured to retain the image sensor in position with respect to at least the body or clothing of a user.

15. A system as claim 14 recites, wherein the image sensor is configured to provide the image of an area not visible to the user.

16. A system as claim 12 recites, further comprising a user-input control, wherein the operations further comprise determining at least the feature information of the image or the feature information of the query text, determining the output text, and determining the output audio in response to actuation of the user-input control.

17. A computer-executable method, comprising:
operating a convolutional computational model to determine a feature vector of an image;
operating a network computational model to determine a feature vector of query text of a question about the image;
determining a relationship vector by subtracting the feature vector of the query text from the feature vector of the image;
selecting at least one of a predetermined plurality of natural-language outputs as an answer to the question based at least in part on the relationship vector: and.
operating a second network computational model based at least in part on the relationship vector to provide output value(s) of respective output(s) of the predetermined plurality of natural-language outputs, wherein the selecting comprises selecting the at least one of the predetermined plurality of outputs having respective output values in a selected range.

18. A computer-executable method as claim 17 recites, further comprising jointly training the network computational model and the second network computational model based at least in part on training data.

* * * * *